(12) United States Patent
Sasahara et al.

(10) Patent No.: US 8,579,055 B2
(45) Date of Patent: Nov. 12, 2013

(54) ELECTRIC ZERO-TURN WORKING VEHICLE

(75) Inventors: Kengo Sasahara, Hyogo (JP); Kazunari Koga, Hyogo (JP); Masaya Itou, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 151 days.

(21) Appl. No.: 13/082,624

(22) Filed: Apr. 8, 2011

(65) Prior Publication Data

US 2011/0247886 A1    Oct. 13, 2011

(30) Foreign Application Priority Data

Apr. 8, 2010 (JP) ................................. 2010-089642

(51) Int. Cl.
   *B62D 11/04*    (2006.01)
(52) U.S. Cl.
   USPC .......................................................... 180/6.5
(58) Field of Classification Search
   USPC ........... 180/6.5, 6.24, 6.28, 65.1, 65.51, 65.6; 56/14.7, 10.8
   See application file for complete search history.

(56) References Cited

U.S. PATENT DOCUMENTS

| 8,056,653 B2 * | 11/2011 | Hunt et al. ................... 180/6.24 |
| 2003/0106296 A1 * | 6/2003 | Ishimori ........................ 56/10.8 |
| 2008/0264026 A1 * | 10/2008 | Ishii et al. ...................... 56/10.8 |

FOREIGN PATENT DOCUMENTS

| EP | 1 943 894 A2 | 7/2008 |
| EP | 1 985 487 A2 | 10/2008 |
| EP | 2 110 295 A2 | 10/2009 |
| JP | H10-35305 A | 2/1998 |
| JP | 2002-356116 A | 12/2002 |
| JP | 2007-153130 | 6/2007 |

OTHER PUBLICATIONS

Office Action in corresponding Japanese Application No. 2010-089642, issued Sep. 3, 2013, 2 pages, with 2-page English translation Summary.

* cited by examiner

*Primary Examiner* — Tony Winner
(74) *Attorney, Agent, or Firm* — Sterne, Kessler, Goldstein & Fox P.L.L.C.

(57) ABSTRACT

An electric zero-turn working vehicle comprises a vehicle body frame, right and left drive wheels, right and left first electric motors for driving the respective right and left drive wheels, a transaxle including at least one of the right and left first electric motors, a working implement, and a second electric motor for driving the working implement. The right and left first electric motors have a space therebetween. The transaxle is supported by the vehicle body frame and is disposed below the vehicle body frame. At least a part of the second electric motor is disposed in the space between the right and left first electric motors.

12 Claims, 27 Drawing Sheets

ELECTRIC ZERO-TURN WORKING VEHICLE

BACKGROUND OF THE INVENTION

1. Field of the Invention

The present invention relates to an electric zero-turn working vehicle, such as a lawn mower, equipped with a pair of right and left electric motors for driving respective right and left drive wheels, and equipped with an electric motor for driving a working implement, such a mower unit.

2. Background Art

An electric tractor disclosed by JP 2002-356116 A, serving as a typical electric working vehicle, is equipped with a battery, a traveling electric motor, and a PTO (power take-off) electric motor. The traveling electric motor is supplied with electric power from the battery to drive right and left drive wheels. The PTO electric motor is also supplied electric power from the battery to drive a PTO shaft for driving a working implement. The electric tractor is advantageously lightened because the battery, the traveling electric motor and the PTO electric motor are light in comparison with an engine and implements surrounding the engine, e.g., a radiator and a muffler. Further, the electric tractor is advantageous in environmental protection because it is free from problems accompanied with an engine, e.g., emission, noise and vibration.

A lawn mower disclosed by JP 2007-153130 A, serving as a typical zero-turn working vehicle, is equipped with a pair of right and left transaxles for driving respective right and left drive wheels, and is equipped with a PTO shaft for driving blades in a mower unit, serving as a working implement attached to the vehicle. The right and left transaxles support respective axles of the right and left drive wheels, and can be differentially driven for zero-turn of the lawn mower. This lawn mower is equipped with an engine for driving the right and left transaxles and the PTO shaft. More specifically, an output shaft of the engine is drivingly connected via a belt transmission to input shafts of the respective right and left transaxles, and is extended to serve as the PTO shaft that is drivingly connected via another belt transmission to the blades of the mower unit. The right and left transaxles are compact so as to miniaturize the lawn mower, however, a space between the right and left transaxles can be large enough to arrange a grass duct connected to the mower unit.

An electric zero-turn working vehicle, such as a lawn mower, is desired to have a pair of right and left electric motors for driving respective right and left drive wheels in consideration of the above-mentioned electric tractor that is advantageous in reduction of weight and in environmental protection, and in consideration of the above-mentioned lawn mower that is advantageous in its zero-turn performance. When the above-mentioned zero-turn lawn mower is intended to have right and left electric motors for driving respective right and left drive wheels, it is noticeable that the pair of right and left transaxles supporting respective axles of the right and left drive wheels should include the right and left electric motors, respectively.

Here, a problem arises that a relatively heavy PTO electric motor for driving a working implement may adversely affect the balance of the vehicle if the PTO electric motor is disposed adjacent to the working implement, such as a mower unit, that is distant from the right and left transaxles adjacent to the right and left drive wheels. On the contrary, if the PTO electric motor is distant from a working implement, for example, if the PTO electric motor is disposed above one of front and rear portions of a vehicle body frame, and a mower unit serving as the working implement is disposed below the other of front and rear portions of the vehicle body frame, loss of power transmitted from the PTO electric motor to the working implement may increase or the PTO electric motor may have to increase its capacity for covering the power loss.

BRIEF SUMMARY OF THE INVENTION

An object of the invention is to provide an electric zero-turn working vehicle that is free from poor balance and/or power loss caused by a wrong arrangement of an electric motor for driving a working implement.

To achieve the object, an electric zero-turn working vehicle according to the invention comprises a vehicle body frame, right and left drive wheels, right and left first (traveling) electric motors for driving the respective right and left drive wheels, a transaxle including at least one of the right and left first electric motors, a working implement, and a second (PTO) electric motor for driving the working implement. The right and left first electric motors have a space therebetween. The transaxle includes at least one of the right and left first electric motors. The transaxle is supported by the vehicle body frame and is disposed below the vehicle body frame. At least a part of the second electric motor is disposed in the space between the right and left first electric motors.

Therefore, the second electric motor is located at or adjacent to a centroidal portion of the electric zero-turn working vehicle where the transaxle, the right and left first electric motors and the right and left drive wheels are concentrated, thereby improving an equilibrium of the vehicle, which promotes stable traveling, turning and working of the vehicle. If the working implement is disposed below the vehicle body frame, a space below the vehicle body frame can be used for arranging an electric power transmission passage from the second electric motor to the working implement so that the electric power transmission passage can be linear to reduce a power loss.

In a first aspect of the electric zero-turn working vehicle in which the at least a part of the second electric motor is disposed in the space between the right and left first electric motors, the transaxle includes one of the right and left first electric motors, and the electric zero-turn working vehicle further comprises another transaxle including the other of the right and left first electric motors, so that the transaxle including the right first electric motor is defined as a right transaxle, the transaxle including the left first electric motor is defined as a left transaxle, and a space is provided between the right and left transaxles so as to define the space between the right and left first electric motors.

Therefore, each of the right and left transaxles can be compact, and the space between the right and left transaxles is adaptable to correspond to a required width of the electric zero-turn working vehicle or other parameter.

In the first aspect, preferably, the electric zero-turn working vehicle further comprises a connection member and a drive unit. The connection member is interposed between the right and left transaxles so as to connect the right and left transaxles to each other. The drive unit includes the second electric motor, and is provided on the connection member.

Therefore, the connection member and the drive unit ensure a sufficient rigidity of a portion of the electric zero-turn working vehicle between the right and left transaxles so as to ensure stable traveling, turning and working of the vehicle. Further, the right and left transaxles, including the respective right and left first electric motors, the connection member, and the drive unit, including the second electric motors, can be assembled together into an assembly, which can be easily attached to the vehicle body frame and can be easily detached from the vehicle body frame so as to be convenient to maintenance.

Alternatively, in the first aspect, preferably, the electric zero-turn working vehicle further comprises a motor casing incorporating the second electric motor. The motor casing is interposed between the right and left transaxles so as to connect the right and left transaxles to each other.

Therefore, the motor casing incorporating the second electric motor ensures a sufficient rigidity of a portion of the electric zero-turn working vehicle between the right and left transaxles so as to ensure stable traveling, turning and working of the vehicle. Further, the right and left transaxles, including the respective right and left first electric motors, and the motor casing, incorporating the second electric motor, can be assembled together into an assembly that can be easily attached to the vehicle body frame and can be easily detached from the vehicle body frame so as to be convenient to maintenance. Further, no additional connection member for connecting the right and left transaxles to each other is required because the motor casing connects the right and left transaxles to each other, thereby reducing the number of parts so as to reduce costs.

Further preferably, the motor casing connects the right and left transaxles to the vehicle body frame.

Therefore, no additional connection member for connecting the right and left transaxles to the vehicle body frame is required, thereby reducing the number of parts so as to reduce costs.

Further preferably, the electric zero-turn working vehicle further comprises a battery for supplying electric power to the right and left first electric motor and the second electric motor. The battery is mounted on the motor casing.

Therefore, a space adjacent to the motor casing, e.g., above the motor casing, is used for arranging the battery mounted on the motor casing, thereby requiring no other space for arranging the battery so as to miniaturize the electric zero-turn working vehicle, and thereby ensuring a sufficient rigidity of a portion of the electric zero-turn working vehicle between the right and left transaxles so as to ensure stable traveling, turning and working of the vehicle.

Alternatively, in a second aspect of the electric zero-turn working vehicle in which the at least a part of the second electric motor is disposed in the space between the right and left first electric motors, the transaxle includes a transaxle casing incorporating the right and left first electric motors and the second electric motor, so that the space between the right and left first electric motors is provided in the transaxle casing.

Therefore, the transaxle ensures a sufficient rigidity of a portion of the electric zero-turn working vehicle between the right and left drive wheels so as to ensure stable traveling, turning and working of the vehicle. The transaxle can serve as an assembly, including the right and left first electric motors and the second electric motor, which can be easily attached to the vehicle body frame and can be easily detached from the vehicle body frame so as to be convenient to maintenance. No additional member for covering the space between the right and left first electric motors or for supporting the second electric motor is required, thereby reducing the number of parts so as to reduce costs. Further, if the transaxle casing is supplied therein with lubricating fluid for lubricating interior parts, e.g., gears, the lubricating oil can be used for cooling the right and left first electric motor and/or the second electric motor, thereby promoting proper performance of the transaxle and/or the working implement, and thereby prolonging life of the first electric motors and/or the second electric motor.

In the second aspect, preferably, the transaxle casing has a hole, and wires for controlling the right and left first electric motors and the second electric motor are bundled and passed through the hole.

Therefore, the bundled wires can be formed into a harness, thereby reducing the number of separate wires and simplifying wiring. No other hole for passing a wire is required, thereby simplifying the transaxle casing, reducing the number of processes for producing the transaxle casing, and reducing the possibility of a leak of fluid in the transaxle casing causing reduction of the effect of cooling the electric motor or motors.

In the second aspect, preferably, the second electric motor has a motor shaft, and an end of the motor shaft projects outward from the transaxle casing. The electric zero-turn working vehicle further comprises a cooling fan fixed on the end of the motor shaft.

Therefore, the cooling fan is driven only when the second electric motor is driven, i.e., only at work, thereby reducing consumption of electric power and running costs. Further, the cooling fan can cool the transaxle casing so that, if the transaxle casing is supplied therein with lubricating fluid for lubricating the right and left first electric motors and the second electric motor in the transaxle casing, the lubricating oil is also cooled by the cooling fan through the transaxle casing so as to cool the right and left first electric motors and the second electric motor. No other means for cooling the lubricating oil is required, thereby reducing costs and simplifying the transaxle so that the transaxle can be easily attached to the vehicle body frame and can be easily detached from the vehicle body frame so as to be convenient to maintenance.

In a third aspect of the electric zero-turn working vehicle in which the at least a part of the second electric motor is disposed in the space between the right and left first electric motors, the working implement is a mower unit disposed below the vehicle body frame. The electric zero-turn working vehicle further comprises a grass box, and a grass duct interposed between the mower unit and the grass box so as to guide grass mowed by the mower unit to the grass box.

Therefore, the electric zero-turn vehicle that has the above-mentioned effects can serve as a lawn mower.

In the third aspect, preferably, the grass duct is extended through the space between the right and left first electric motors.

Therefore, no space other than the space between the right and left first electric motors is required to prevent the grass duct from interfering with the right or left first electric motor, thereby miniaturizing the electric zero-turn working vehicle.

Alternatively, in the third aspect, preferably, the grass duct is extended above the space between the right and left first electric motors.

Therefore, only a space above the space between the right and left first electric motors is used for extending the grass duct so as to prevent the grass duct from interfering with the right or left first electric motor, thereby miniaturizing the electric zero-turn working vehicle.

Alternatively, to achieve the object, an electric zero-turn working vehicle comprises a vehicle body frame, right and left drive wheels, right and left first (traveling) electric motors for driving the respective right and left drive wheels, right and left transaxles, a working implement, a second (PTO) electric motor for driving the working implement, a connection member, and a drive unit. The right and left transaxles are supported by the vehicle body frame and are disposed below the vehicle body frame. The right transaxle includes the right first electric motor, and the left transaxle includes the left first electric motor. The connection member is interposed between the right and left transaxles so as to connect the right and left transaxles to each other. The drive unit includes the second electric motor. The drive unit is provided adjacent to one of the right and left transaxles and is supported by the vehicle body frame, so that the one of the right and left transaxles is supported by the vehicle body frame via the drive unit.

Therefore, even if no part of the second electric motor is disposed in a space between the right and left first electric motors, the second electric motor is provided adjacent to the one of the right and left transaxles so as to neighbor a centroidal portion of the electric zero-turn working vehicle where the right and left transaxles, including the right and left first electric motors, and the right and left drive wheels are concentrated, thereby improving an equilibrium of the vehicle for stable traveling, turning and working of the vehicle. If the working implement is disposed below the vehicle body frame, a space below the vehicle body frame can be used for arranging an electric power transmission passage from the second electric motor to the working implement so that the electric power transmission passage can be linear to reduce a power loss. Further, the connection member ensure a sufficient rigidity of a portion of the electric zero-turn working vehicle between the right and left transaxles so as to ensure stable traveling, turning and working of the vehicle. On the other hand, the drive unit is supported to the vehicle body frame so that the one of the right and left transaxles is supported by the vehicle body frame via the drive unit, whereby the drive unit and the right and left transaxles connected to each other via the connection member are sufficiently strongly supported by the vehicle body frame. Further, the right and left transaxles, including the respective right and left first electric motors, the connection member, and the drive unit, including the second electric motors, can be assembled together into an assembly, which is easily attached to the vehicle body frame and is easily detached from the vehicle body frame so as to be convenient to maintenance.

These, further and other objects, features and advantages of the invention will appear more fully from the following detailed description with reference to the accompanying drawings.

BRIEF DESCRIPTION OF THE DRAWINGS

FIG. 22($b$) is a cross sectional view taken along X-X line of FIG. 22($a$).

FIG. 23($b$) is a cross sectional view taken along A-A line of FIG. 23($a$).

FIG. 24($b$) is a cross sectional view taken along B-B line of FIG. 24($a$).

FIG. 25($b$) is a cross sectional view taken along C-C line of FIG. 25($a$).

FIG. 26($b$) is a cross sectional view taken along D-D line of FIG. 26($a$).

FIG. 27($b$) is a cross sectional view taken along E-E line of FIG. 27($a$).

DETAILED DESCRIPTION OF THE INVENTION

Figure 1:
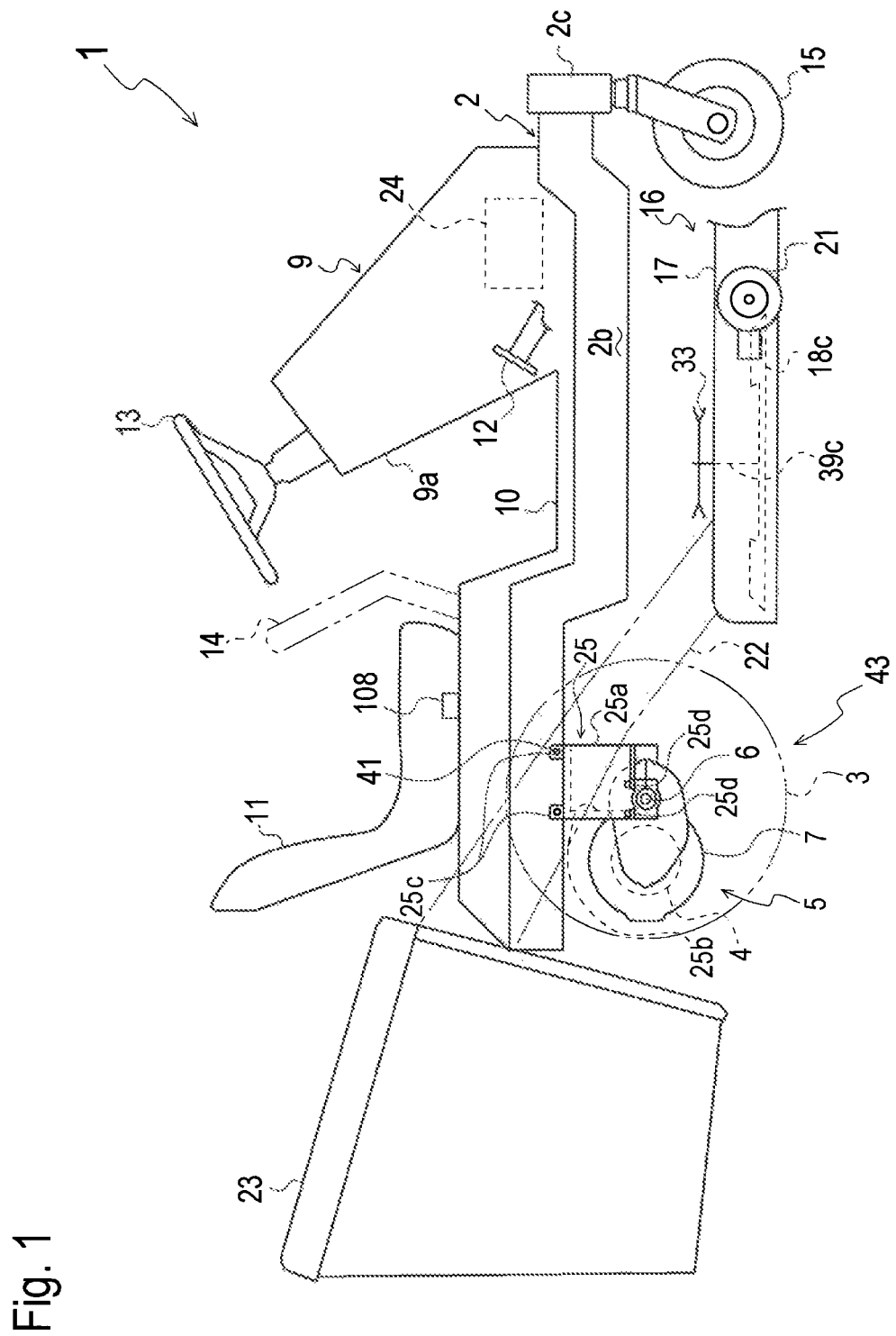
FIG. 1 is a side view of a lawn mower 1 serving as an electric zero-turn working vehicle according to an embodiment 1 wherein at least a part of a PTO electric motor is disposed in a motor gap space between right and left traveling electric motors.

Lawn mowers 1, 1A, 1B, 1C, 1D, 1E, 145 and 157 serving as electric zero-turn working vehicles according to some embodiments of the invention will be described with reference to attached drawings.

Referring to FIGS. 1 to 3, 12 and 13, an electric zero-turn working vehicle according to an embodiment 1 is defined as being provided with right and left independent transaxles, which include respective traveling (first) electric motors and are connected to each other via a connection member. The electric zero-turn working vehicle according to embodiment 1 has a PTO drive unit including a PTO (second) electric motor, and the PTO drive unit is separated from the connection member and is mounted onto the connection member so that at least a part of the PTO electric motor is disposed in a motor gap space between the traveling electric motors.

A lawn mower 1 serving as an electric zero-turn working vehicle according to embodiment 1 will be described with reference to FIGS. 1 to 3. Lawn mower 1 includes a vehicle body frame 2, and right and left drive wheels 3 are disposed on right and left outsides of a rear portion of vehicle body frame 2, respectively, so as to serve as right and left rear wheels of lawn mower 1. Right and left transaxles 5 are supported by the rear portion of vehicle body frame 2 and are disposed below vehicle body frame 2. Right and left transaxles 5 include respective right and left traveling electric motors 4 for driving respective right and left drive wheels 3. Right and left transaxles 5 and right and left drive wheels 3 are assembled into a rear-wheel driving assembly 43 as detailed later.

Right and left transaxles 5 include respective right and left transaxle casings 7 each of which incorporates corresponding traveling electric motor 4 and a reduction gear train 67 (see FIG. 8 regarding another later-discussed embodiment). Right and left axles 6, serving as center axes of respective right and left drive wheels 3, are journalled by respective right and left transaxle casings 7, and are extended laterally distally outward from respective right and left transaxle casings 7. A hub 8 is fixed on a distal end of each axle 6, and is fitted in a rim 3a of each of right and left drive wheels 3.

In the illustrated embodiment, right and left transaxles 5 are arranged to have traveling electric motors 4 rearward from axles 6. However, right and left transaxles 5 can be arranged to have traveling electric motors 4 forward from axles 6. More specifically, right and left transaxles 5 are laterally symmetric in shape of respective transaxle casings 7 thereof and in arrangement of interior components of respective transaxle casings 7 thereof, e.g., traveling electric motors 4, reduction gear trains 67 and axles 6. Therefore, right and left transaxles 5 may be configured so that each of right and left transaxles 5 can be reversed to serve as the other of right and left transaxles 5.

On vehicle body frame 2 are arranged a bonnet 9, a dashboard 9a, a platform 10, and an operator's seat 11, one behind another. An accelerator pedal 12 is provided at a foot portion of dashboard 9a, and a steering wheel 13 is extended upward from an upper portion of dashboard 9a. Rotary speeds of respective right and left traveling electric motors 4 are evenly changed to correspond to depression of accelerator pedal 12, thereby changing rotary speed of right and left drive wheels 3, i.e., changing a traveling speed of lawn mower 1. Rotary speeds of respective right and left traveling electric motors 4 are differentially changed to correspond to rotational direction and degree of steering wheel 13, thereby differentially rotating right and left drive wheels 3, i.e., turning lawn mower 1 rightward or leftward. Lawn mower 1 can zero-turn by rotating right and left drive wheels 3 in opposite directions and at even speeds.

Accelerator pedal 12 and steering wheel 13 may be replaced with a pair of right and left manipulation levers 14 as drawn in phantom lines in FIG. 1, which are manipulated equally for changing the forward or backward traveling speed of lawn mower 1 and are manipulated differentially for turning lawn mower 1 rightward or leftward. Any manipulation means for speed-changing and steering lawn mower 1 may be provided only if an electric signal corresponding to degree and direction of manipulation can be issued from the manipulation means so as to be converted to command signals to right and left traveling electric motors 4.

Vehicle body frame 2 includes a pair of right and left side plates 2b extended in the fore-and-aft direction of lawn mower 1, and includes a front plate 2a extended in the lateral direction of lawn mower 1 so as to connect front ends of right and left side plates 2b to each other. Front plate 2a is formed on right and left ends thereof with respective bosses 2c. A pair of right and left front wheels 15 have respective vertical pivot shafts 15a that are fitted into respective bosses 2c so as to be rotatable relative to vehicle body frame 2, thereby enabling right and left front wheels 15 to horizontally rotate following the traveling and turning direction of lawn mower 1. Castors can serve as right and left front wheels 15.

Figure 13:
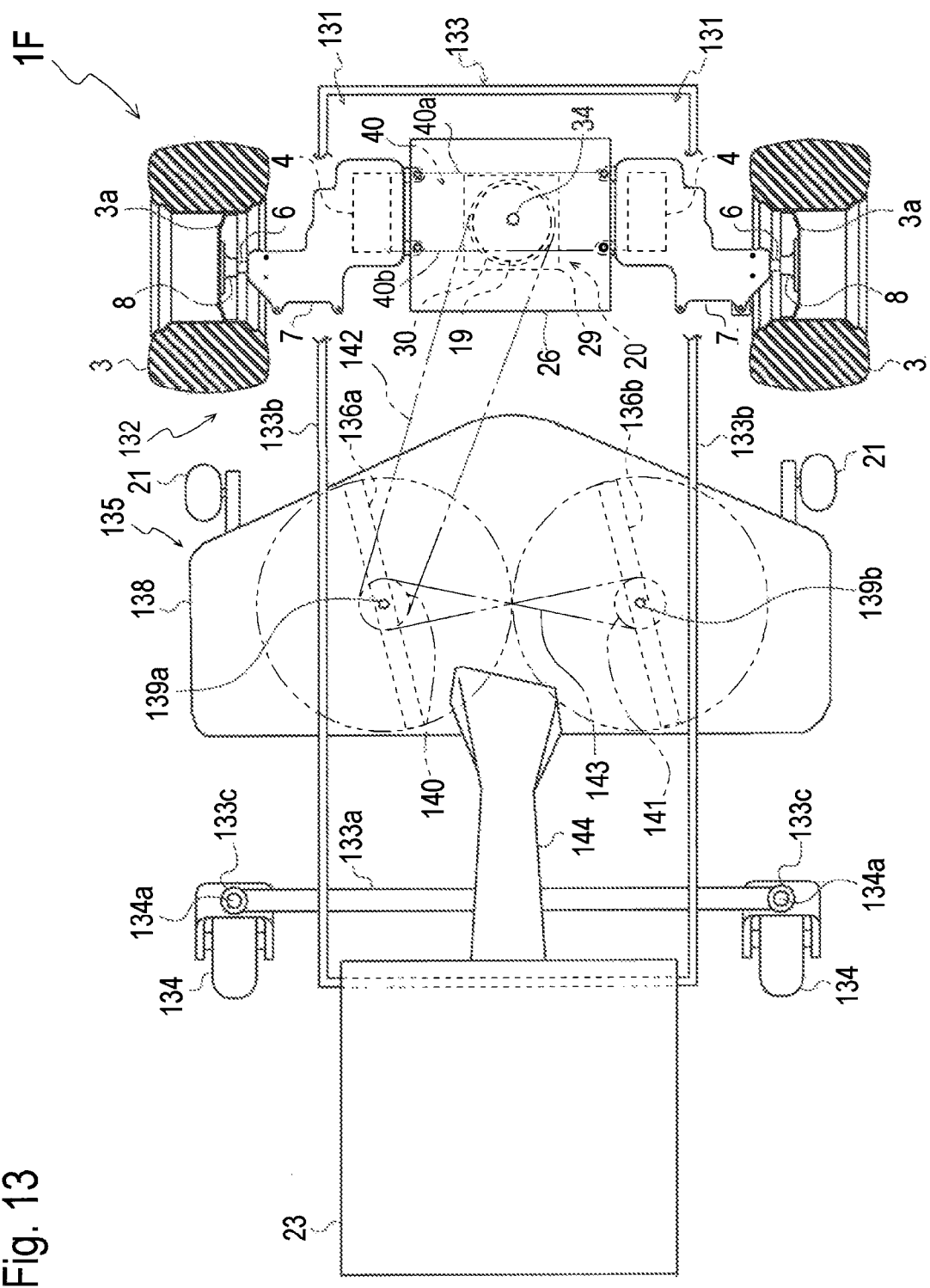
FIG. 13 is a plan view partly in section of lawn mower 1F.

Lawn mower 1 is provided with a mower unit 16 below vehicle body frame 2 and forward from right and left transaxles 5. In this embodiment, mower unit 16 includes a mower deck 17 incorporating three rotary blades, i.e., a left blade 18a, a middle blade 18b and a right blade 18c. Alternatively, the number of blades of mower unit 16 may be different, e.g., two blades as shown in FIG. 13 regarding another embodiment.

A front end portion of mower deck 17 is provided with gauge wheels 21 on right and left ends thereof and on a lateral middle portion thereof. Mower deck 17 is suspended downward from vehicle body frame 2 via a linkage (not shown). Heights of gauge wheels 21 can be adjusted so as to adjust heights of blades 18a, 18b and 18c for adjusting a height or degree of mowing grass.

Blades 18a, 18b and 18c are driven by driving a PTO electric motor 19 whose arrangement is discussed later. Lawn mower 1 is provided with a mower manipulator (e.g., mower operation device 108), such as a switch, adjacent to operator's seat 11 so as to switch on/off PTO electric motor 19.

A grass duct 22 is extended upwardly rearward from a lateral middle of a rear portion of mower deck 17. A grass box 23 is disposed at a rear end portion of vehicle body frame 2 and is connected to a rear end of grass duct 22. Grass mowed by blades 18a, 18b and 18c is sent from mower unit 16 to grass box 23 via grass duct 22, and is accumulated in grass box 23.

A battery 24 for supplying electric power to electric motors 4 and 19 is disposed in bonnet 9 above a front portion of vehicle body frame 2, thereby balancing lawn mower 1 with right and left transaxles 5 below the rear portion of vehicle body frame 2.

Arrangement of transaxles 5 and PTO electric motor 19 in lawn mower 1 will be described with reference to FIGS. 1 to 3. As shown in FIG. 3, a pair of front and rear bosses 7a are extended horizontally from each of lateral proximal ends of right and left transaxle casings 7, i.e., a left end of right transaxle casing 7 and a right end of left transaxle casing 7. A horizontal pate-shaped connection member 26 is formed with bolt holes in right and left end portions thereof, and is fastened to right and left transaxle casings 7 by bolts 27 screwed into bosses 7a through the bolt holes of connection member 26, and by nuts 28 screwed on respective bolts 27.

A PTO drive unit 20 including PTO electric motor 19 is mounted on a center portion of connection member 26 when viewed in plan. PTO drive unit 20 includes a PTO motor casing 29 incorporating PTO electric motor 19. PTO motor casing 29 is placed on connection member 26, and is fastened to connection member 26 by bolts 38, thereby fixing PTO drive unit 20 to connection member 26.

In this way, rear-wheel driving assembly 43, including right and left transaxles 5 and right and left drive wheels 3 as mentioned above, further includes connection member 26 interposed between right and left transaxle casings 7, and includes PTO drive unit 20 mounted to connection member 26.

Right and left transaxles 5, i.e., right and left transaxle casings 7 have a space therebetween. Since right and left transaxles 5 are separated from each other, a lateral width of this space is variable depending on a distance between right and left transaxle casings 7 in correspondence to a lateral width of vehicle body frame 2 between right and left side plates 2b, and is defined by connection member 26 interposed between right and left transaxle casings 7. Lawn mower 1 uses this space between right and left transaxle casings 7 for accommodating PTO drive unit 20 that includes PTO electric motor 19 and that is mounted on connection member 26.

Further, the space between right and left transaxle casings 7 includes a motor gap space 40 that is defined as a space between right and left traveling electric motors 4. When viewed in plan, as shown in FIG. 2, front and rear ends of motor gap space 40 are defined by a front end line 40a extended laterally of lawn mower 1 to connect foremost ends of right and left traveling electric motors 4 to each other, and by a rear end line 40b extended laterally of lawn mower 1 to connect rearmost ends of right and left traveling electric motors 4 to each other. When viewed in front, as shown in FIG. 3, top and bottom ends of motor gap space 40 are defined by a top end line 40c extended laterally of lawn mower 1 to connect top ends of right and left traveling electric motors 4 to each other, and by a bottom end line 40d extended laterally of lawn mower 1 to connect bottom ends of right and left traveling electric motors 4 to each other.

Each traveling electric motor 4 is so heavy as to occupy the major part of the weight of corresponding transaxle 5. An equilibrium point between right and left traveling electric motors 4 exists in motor gap space 40 at an equilateral position between right and left traveling electric motors 4, and this equilibrium point should be a centroid of rear-wheel driving assembly 43, which can also be defined as a centroid of lawn mower 1. Therefore, connection member 26 having PTO drive unit 20 thereon covers or intersects motor gap space 40 so that at least a part of considerably heavy PTO electric motor 19, e.g., nearly the entirety of PTO electric motor 19, is disposed in motor gap space 40 at or adjacent to the equilateral position between right and left traveling electric motors 4. Whereby PTO electric motor 19 serves as a centroidal weight of rear-wheel driving assembly 43 and lawn mower 1 so as not to adversely affect the equilibrium between right and left traveling electric motors 4.

Figure 2:
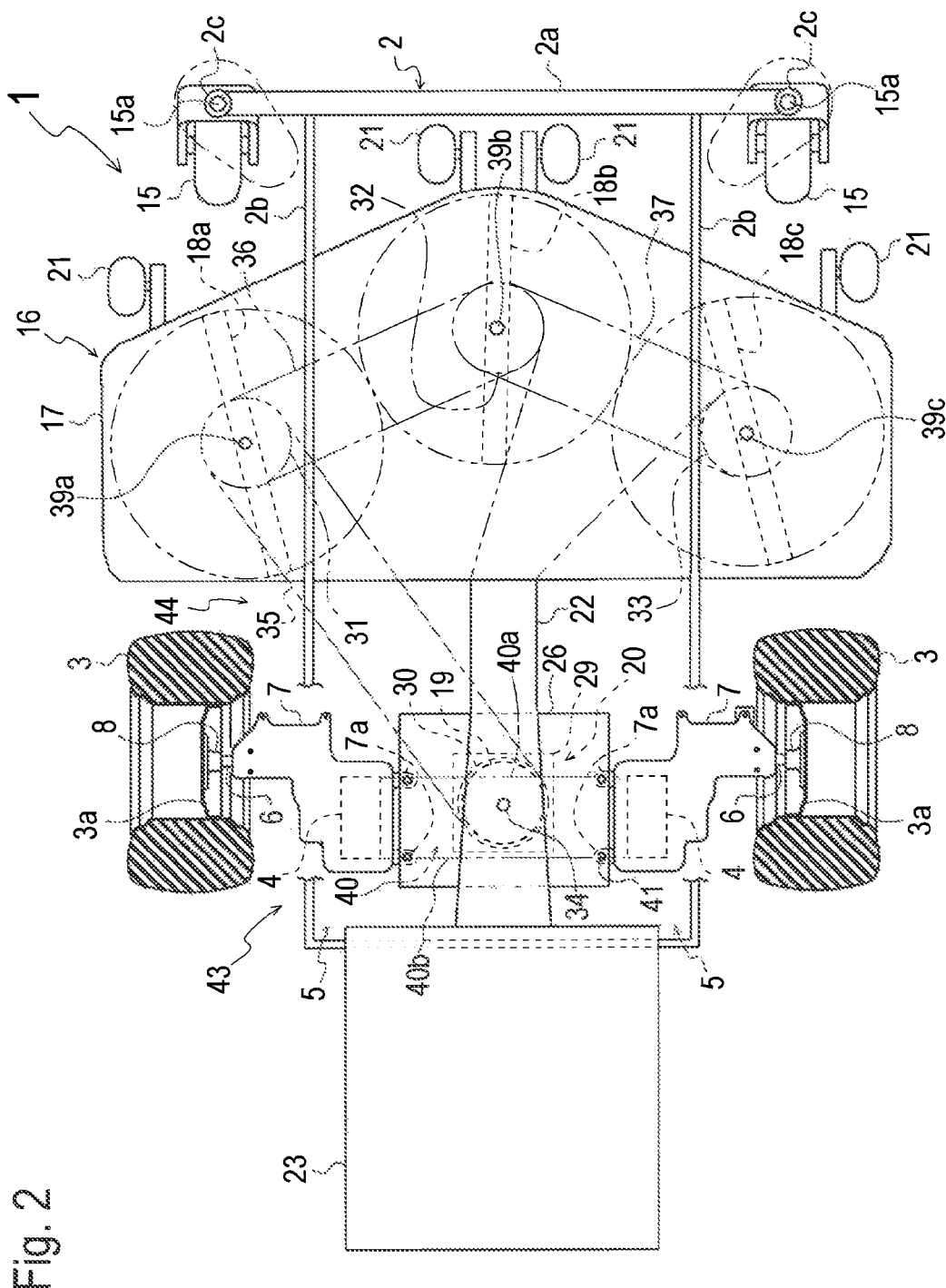
FIG. 2 is a plan view partly in section of lawn mower 1.
Figure 3:
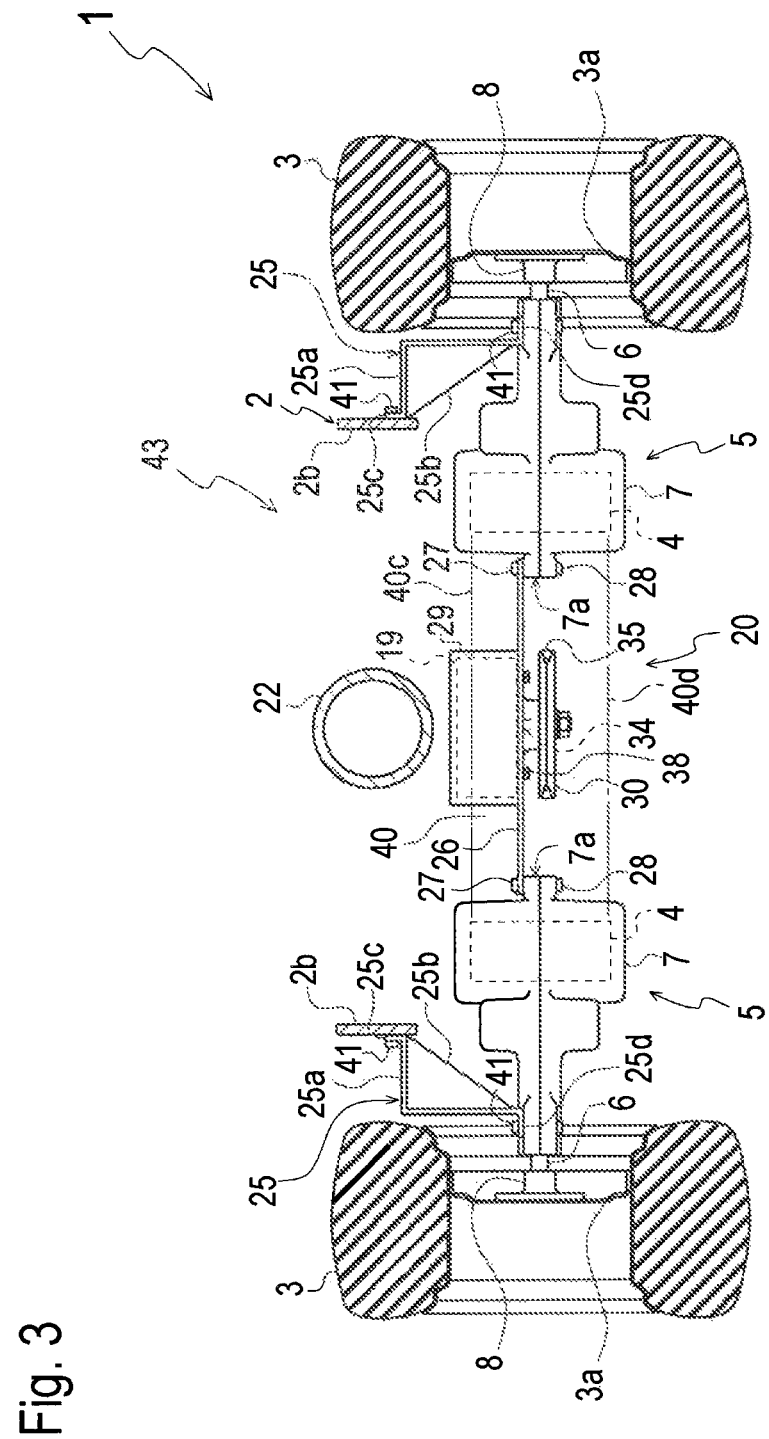
FIG. 3 is a sectional front view of lawn mower 1, including a front view of a rear-wheel driving assembly 43.

As shown in FIGS. 1 to 3, right and left transaxles 5 are disposed below respective right and left side plates 2b of vehicle body frame 2, and are supported by vehicle body frame via respective right and left sub frames 25, i.e., right sub frame 25 interposed between right side plate 2b and transaxle casing 7 of right transaxle 5, and left sub frame 25 interposed between left side plate 2b and transaxle casing 7 of left transaxle 5. In this way, a right combination of transaxle casing 7 of right transaxle 5 and right sub frame 25 and the left combination of transaxle casing 7 of left transaxle 5 and left sub frame 25 are symmetric in the lateral direction of lawn mower 1 with regard to arrangement and shape.

Each of right and left sub frames 25 includes a connection part 25a and a reinforcement part 25b. Connection parts 25a of right and left sub frames 25 are laterally symmetrically bent in front view of lawn mower 1 so as to have respective horizontal portions extended in the lateral direction of lawn mower 1, and to have respective vertical portions extended downward from lateral distal ends of the respective horizontal portions. Reinforcement parts 25b of right and left sub frames 25 are formed in laterally symmetric triangular shapes each of which has a lateral horizontal side fixed to a rear end of the horizontal portion of corresponding connection part 25a, and each of which has a vertical side fixed to a rear end of the vertical portion of corresponding connection part 25a, thereby reinforcing respective connection parts 25a.

Each of right and left sub frames 25 has a pair of front and rear tabs 25c extended horizontally from a lateral proximal end of the horizontal portion of connection part 25a, i.e., right sub frames 25 has a pair of front and rear tabs 25c extended horizontally leftward from a left end of the horizontal portion of connection part 25a, and left sub frames 25 has a pair of front and rear tabs 25c extended horizontally rightward from a right end of the horizontal portion of connection part 25a. Front and rear tabs 25c of respective right and left sub frames 25 are fastened to respective right and left side plates 2b of vehicle body frame 2 by respective bolts 41 screwed through respective bolt holes formed in tabs 25c.

Each of right and left sub frames 25 has a pair of front and rear tabs 25d extended horizontally from a lower end of the vertical portion of connection part 25a. Front and rear tabs 25d of respective right and left sub frames 25 are fastened to top surfaces of lateral distal end portions of respective transaxle casings 7 of respective right and left transaxles 5, i.e., a top surface of a right end portion of transaxle casing 7 of right transaxle 5 and a top surface of a left end portion of transaxle casing 7 of left transaxle 5, by bolts 41 screwed through respective bolt holes formed in tabs 25d.

In this way, right and left transaxles 5 are detachably attached to the rear portions of right and left side plates 2b of vehicle body frame 2 via respective sub frames 25 and via bolts 41. In other words, only the attachment or detachment of right and left transaxle casings 7 to and from right and left side plates 2b of vehicle body frame 2 via right and left sub frames 25 is required to attach or detach rear-wheel driving assembly 43, including right and left transaxles 5 and PTO drive unit 20, to and from vehicle body frame 2. Further, for maintenance of PTO electric motor 19, while right and left transaxle casings 7 are kept as being fixed to vehicle body frame 2, PTO drive unit 20 can be detached from connection member 26, or connection member 26 with PTO drive unit 20 can be detached from right and left transaxle casings 7.

PTO electric motor 19 has a vertical motor shaft 34. A bottom end portion of motor shaft 34 projects downward from PTO motor casing 29, and a PTO pulley 30 is fixed on the bottom end portion of motor shaft 34. On the other hand, mower deck 17 journals vertical blade drive shafts 39a, 39b and 39c on which respective blades 18a, 18b and 18c are fixed. Top end portions of respective blade drive shafts 39a, 39b and 39c project upward from mower deck 17. A pulley 31 is fixed on the top end portion of blade drive shaft 39a of left blade 18a. A pulley 32 is fixed on the top end portion of blade drive shaft 39b of middle blade 18b. A pulley 33 is fixed on the top end portion of blade drive shaft 39c of right blade 18c.

Figure 14:
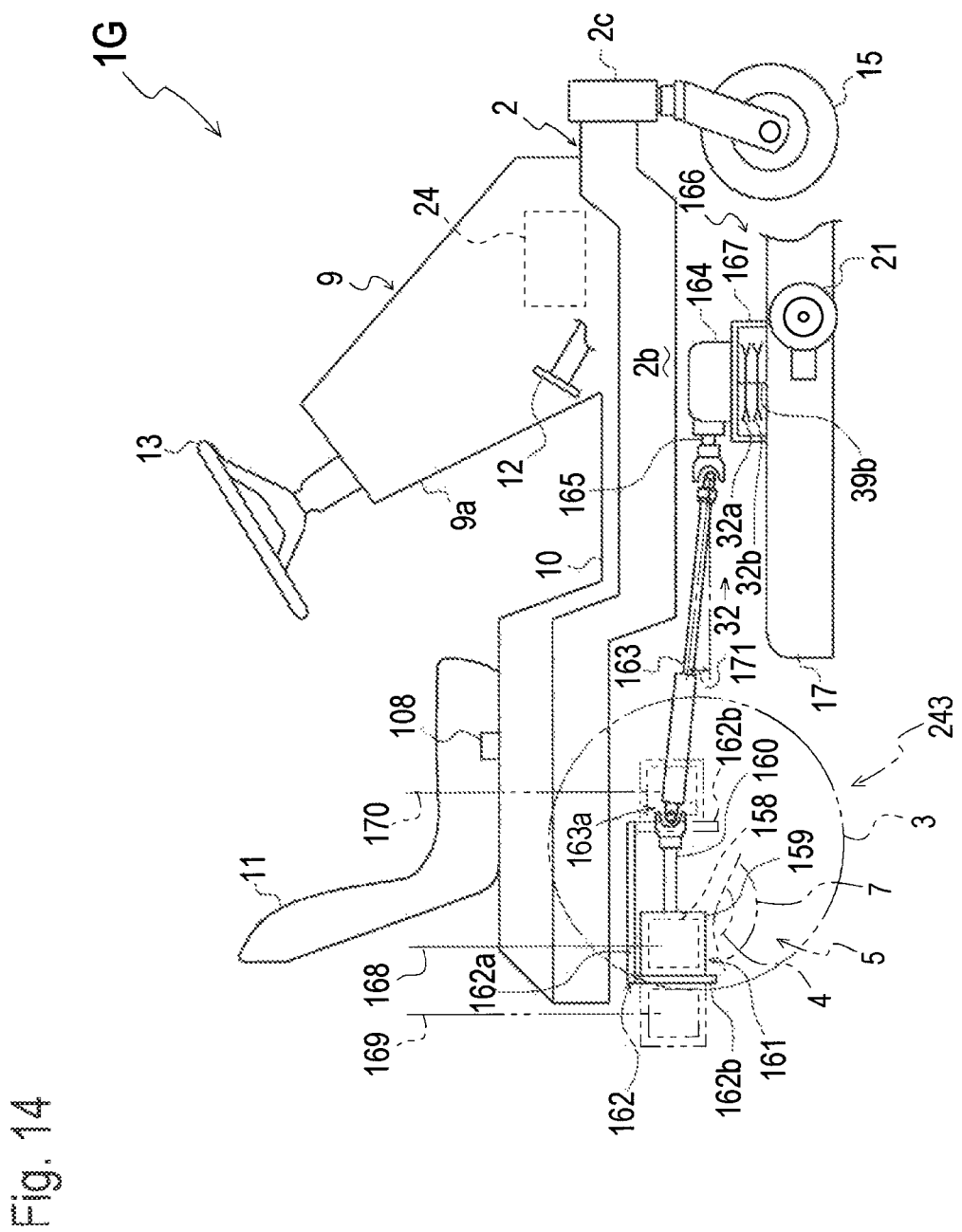
FIG. 14 is a side view of a lawn mower 1G serving as an alternative electric zero-turn working vehicle according to embodiment 1.

Each of pulleys 31 and 32 is a double pulley including upper and lower pulley members (referring to FIG. 14 regarding another embodiment). In the illustrated embodiment, left blade drive shaft 39a serves as an input shaft of mower unit 16, and a belt 35 is interposed between pulley 30 on motor shaft 34 and one of the upper and lower pulley members of pulley 31 on left blade drive shaft 39a. Further, a belt 36 is interposed between the other of the upper and lower pulley members of pulley 31 on left blade drive shaft 39a and one of the upper and lower pulley members of pulley 32 on middle blade drive shaft 39b, and a belt 37 is interposed between the other of the upper and lower pulley members of pulley 32 on middle blade drive shaft 39b and pulley 33 on right blade drive shaft 39c. Therefore, an output power of PTO electric motor 19 is transmitted from motor shaft 34 to left blade drive shaft 39a via belt 35, is transmitted from left blade drive shaft 39a to middle blade drive shaft 39b via belt 36, and is transmitted from middle blade drive shaft 39b to right blade drive shaft 39c via belt 37, thereby synchronously driving blades 18a, 18b and 18c.

The upper and lower pulley members of pulley 31, the upper and lower pulley members of pulley 32, and pulley 33 have respective heights above mower deck 17, and these heights are defined to substantially horizontally extend belts 36 and 37 so as to maximize the efficiency of power transmitted via belts 36 and 37. On the other hand, belt 35 serves as a power transmission passage 44 from motor shaft 34 to blade drive shaft 39a serving as the input shaft of mower unit 16. Pulley 30 on the bottom end of motor shaft 34 and pulley 31 on the top of blade drive shaft 39a have respective heights below vehicle body frame 2, and these heights are substantially equal to each other so that belt 35 is extended substantially horizontally and straight without bending through motor gap space 40 or through a space below motor gap space 40, thereby forming power transmission passage 44 in a horizontal linear shape such that can ensure a sufficient efficiency of transmitting power between vertical shafts 34a and 39a even in the situation that shafts 34a and 39a are distant from each other because they are distributed between front and rear portions of lawn mower 1.

As shown in FIGS. 1 and 3, grass duct 22 extended from mower deck 17 is further extended rearward above motor gap space 40 so as to be prevented from interfering with PTO electric motor 19 or connection member 26.

Figure 12:
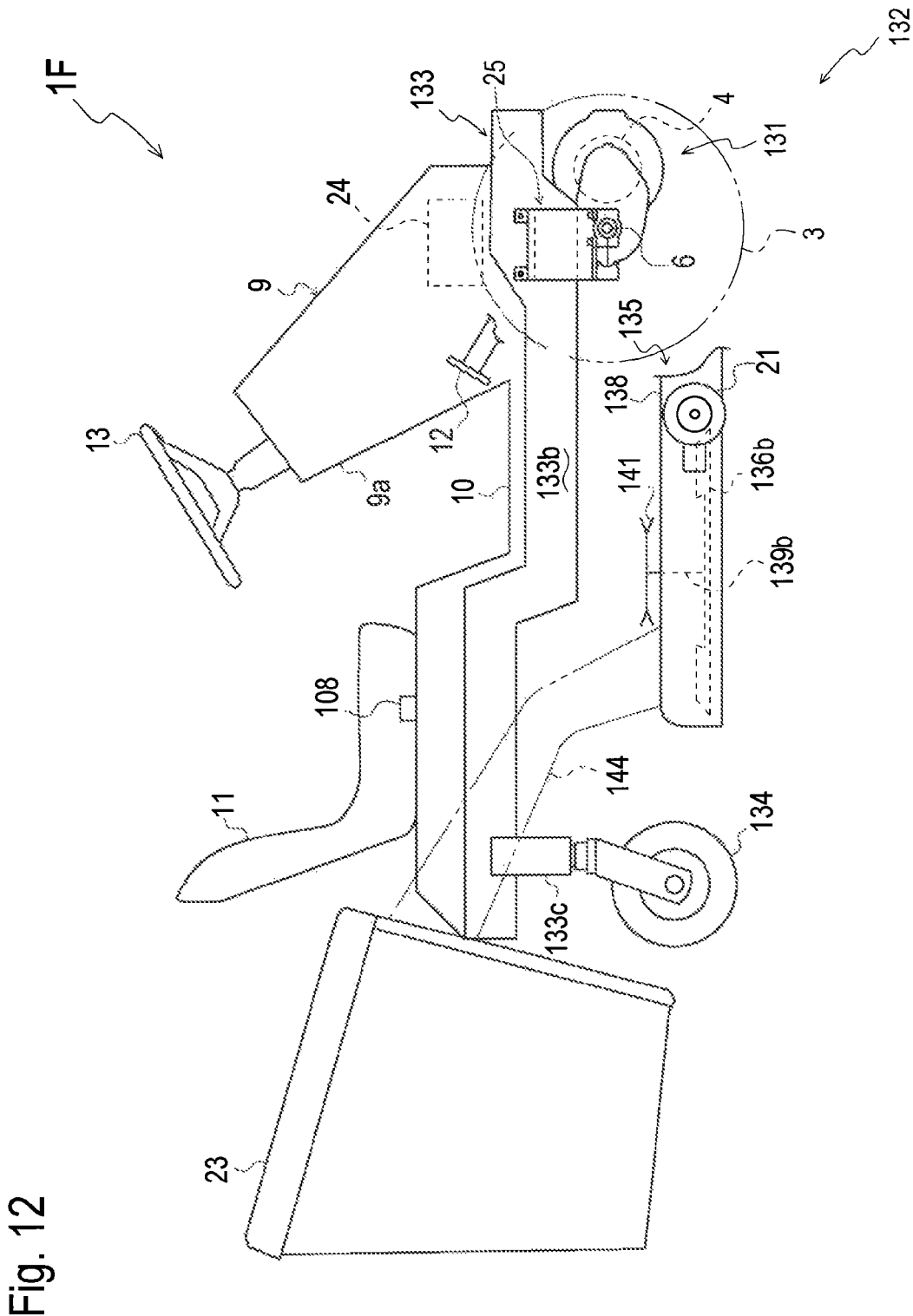
FIG. 12 is a side view of a lawn mower 1F serving as an alternative electric zero-turn working vehicle according to embodiment 1.

A lawn mower 1F serving as an alternative electric zero-turn working vehicle according to embodiment 1 will be described with reference to FIGS. 12 and 13. However, description of members and portions in lawn mower 1F designated by reference numerals that are the same as those designating the corresponding members and portions in lawn mower 1 is omitted because they are integral to the corresponding members and portions in lawn mower 1, or have the same functions as the corresponding members and portions in lawn mower 1. The same is adapted to other lawn mowers described hereinafter.

Lawn mower 1F is provided with a vehicle body frame 133 including a pair of right and left parallel side plates 133b extended in the fore-and-aft direction of lawn mower 1F, and including a rear-wheel support bar 133a extended in the lateral direction of lawn mower 1F across rear portions of right and left side plates 133b. Right and left drive wheels 3 are disposed on right and left outsides of front portions of right and left side plates 133b of vehicle body frame 133, respectively, so as to serve as right and left front wheels of lawn mower 1F. Right and left transaxles 131 are supported by the front portion of vehicle body frame 133 and are disposed below vehicle body frame 133. Right and left transaxles 131 include respective right and left transaxle casings 7, each of which supports axle 6 of corresponding right or left drive wheel 3 and incorporates corresponding traveling electric motor 4 for driving corresponding right or left drive wheel 3.

Transaxle casings 7 of respective right and left transaxles 131 are connected to each other via connection member 26 with PTO drive unit 20, thereby constituting a front-wheel driving assembly 132 including right and left transaxles 131, right and left drive wheels 3, connection member 26 and PTO drive unit 20. Front-wheel driving assembly 132 is disposed below the front portion of vehicle body frame 133 and is attached to the front portion of vehicle body frame 133 by fixing right and left transaxle casings 7 to respective right and left side plates 133b of vehicle body frame 133 via right and left sub frames 25.

Each of right and left transaxles 5 used for lawn mower 1 can serve as either right or left transaxle 131, and rear-wheel driving assembly 43 used for lawn mower 1 can serve as front-wheel driving assembly 132 for lawn mower 1F. In this regard, in the illustrated embodiment, right and left transaxles 131 are arranged to have traveling electric motors 4 forward from axles 6, in contrast with right and left transaxles 5 of rear-wheel driving assembly 43 having traveling electric motors 4 rearward from axles 6. However, right and left transaxles 131 may be arranged to have traveling electric motors 4 rearward from axles 6, by reversing front-wheel driving assembly 132 or by reversing transaxles 131.

Rear-wheel support bar 133a is formed on right and left ends thereof with respective bosses 133c. A pair of right and left rear wheels 134 have respective vertical pivot shafts 134a that are fitted into respective bosses 133c so as to be rotatable relative to vehicle body frame 133, thereby enabling right and left rear wheels 134 to horizontally rotate following the traveling and turning direction of lawn mower 1F. Castors can serve as right and left rear wheels 134.

A mower unit 135 is vertically movably disposed below vehicle body frame 133 between front-wheel driving assembly 132 with right and left front drive wheels 3 and rear-wheel support bar 133a with rear wheels 134. Mower unit 135 includes a mower deck 138 incorporating two rotary blades 136a and 136b. Alternatively, the number of blades of mower unit 135 may be different, e.g., three blades as those of mower unit 16 shown in FIG. 2.

Blades 136a and 136b are driven by driving PTO electric motor 19 of PTO drive unit 20 mounted onto connection member 26 of front-wheel driving assembly 132. In this regard, mower deck 138 journals vertical blade drive shafts 139a and 139b on which respective blades 136a and 136b are fixed. Top end portions of respective blade drive shafts 139a and 139b project upward from mower deck 138. A double pulley 140, including upper and lower pulley members, is fixed on the top end portion of blade drive shaft 139a. A pulley 141 is fixed on the top end portion of blade drive shaft 139b. A belt 142 is interposed between PTO pulley 30 on the bottom end of motor shaft 34 of PTO electric motor 19 and one of the upper and lower pulley members of pulley 140 on blade drive shaft 139a, and a twisted belt 143 is interposed between the other of upper and lower pulley members of pulley 140 on blade drive shaft 139a and pulley 141 on blade drive shaft 139b.

A grass duct 144 is extended upwardly rearward from a lateral middle of a rear portion of mower deck 138 and above rear-wheel support bar 133a, and is connected at a rear end thereof to grass box 23 provided at the rear portion of vehicle body frame 133. Grass mowed by blades 136a and 136b is sent from mower unit 135 to grass box 23 via grass duct 144, and is accumulated in grass box 23. In comparison with grass duct 22 of lawn mower 1 that must have a length so as to extend across rear-wheel driving assembly 43, the length of grass duct 144 can be reduced because of the small fore-and-aft width of rear wheels 134 supported by rear-wheel support bar 133a across which grass duct 144 extends rearward, thereby improving the efficiency of accumulation of grass in grass box 23.

Figure 15:
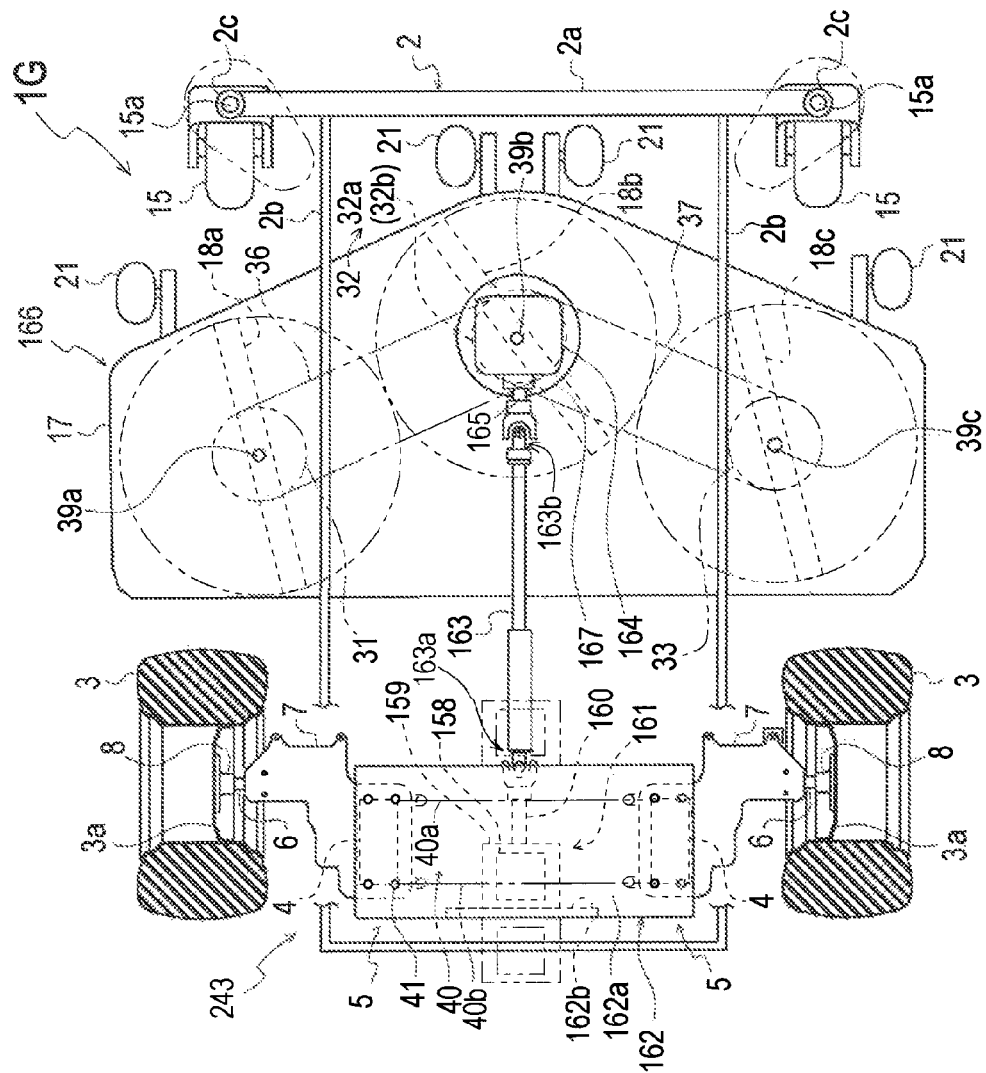
FIG. 15 is a plan view partly in section of lawn mower 1G
Figure 16:
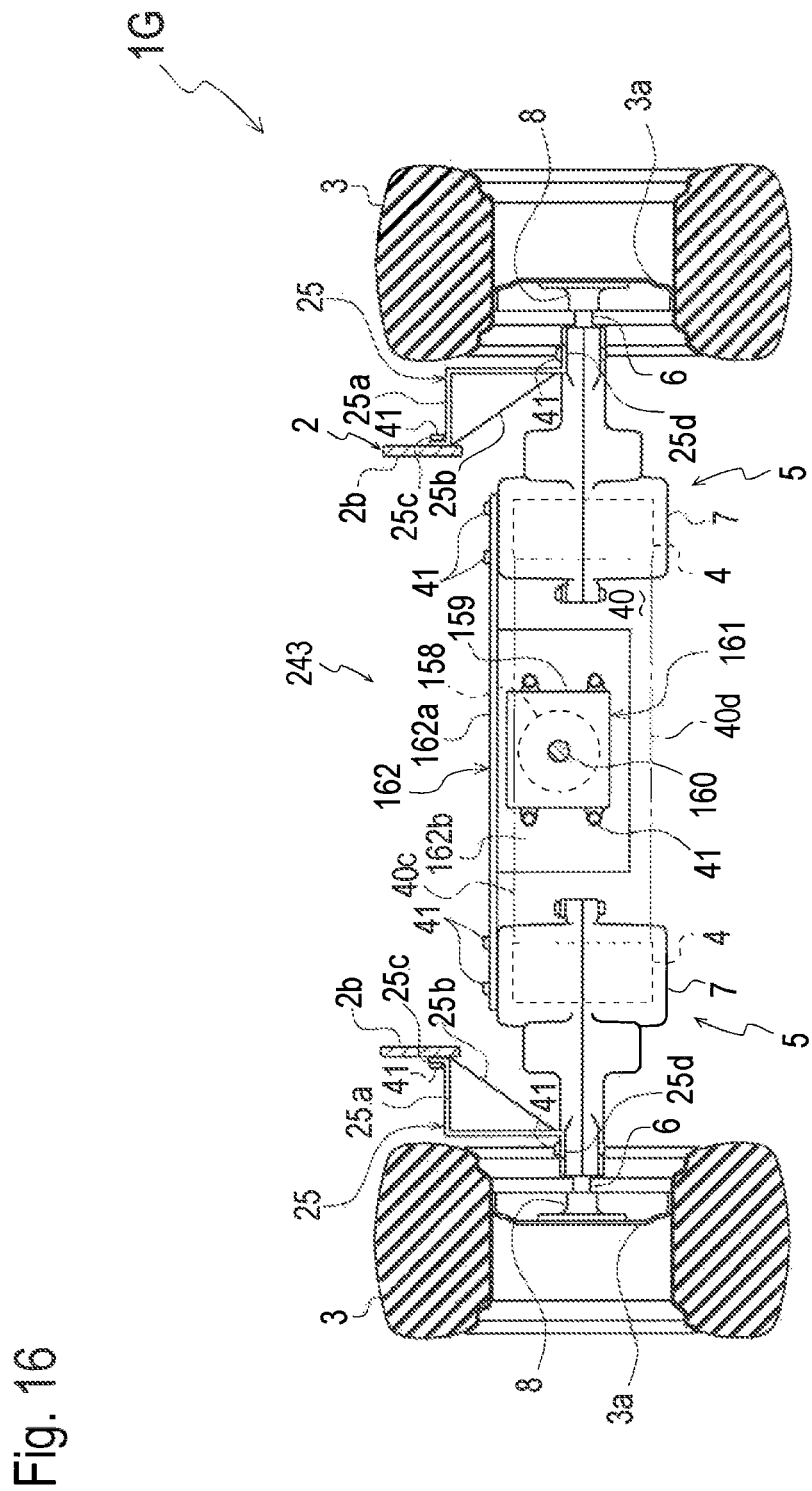
FIG. 16 is a sectional front view of lawn mower 1G, including a front view of a rear-wheel driving assembly 243.

A lawn mower 1G serving as an alternative electric zero-turn working vehicle according to embodiment 1 will be described with reference to FIGS. 14 to 16. Similar to lawn mower 1, lawn mower 1G is provided with right and left drive wheels 3 serving as rear wheels, and is provided with a rear-wheel driving assembly 243 that includes right and left drive wheels 3, right and left transaxles 5 incorporating respective traveling electric motors 4, a connection member 162 interposed between right and left transaxles 5, and a PTO drive unit 161 mounted to connection member 162. PTO drive unit 161 includes a PTO electric motor 158 at least a part of which is disposed in motor gap space 40 defined between right and left traveling electric motors 4.

The different point of lawn mower 1G from lawn mowers 1 and 1F is that lawn mower 1G has a propeller shaft 163 interposed between PTO drive unit 161 and a mower unit 166 via universal joints 163a and 163b, in comparison with lawn mowers 1 and 1F each of which is provided with a belt transmission interposed between PTO drive unit 20 and mower unit 16. In rear-wheel driving assembly 243, connection member 162 and PTO drive unit 161 are configured to be drivingly connected to propeller shaft 163, and mower unit 166 includes an input gear box 164 to be drivingly connected to propeller shaft 163.

In rear-wheel driving assembly 243, connection member 162 is L-shaped when viewed in side so as to include a horizontal plate 162a and a vertical plate 162b. Vertical plate 162b is extended laterally of lawn mower 1G and downward from a lateral middle portion of either a front or rear edge of horizontal plate 162a. In this regard, connection member 162 can be arranged to have vertical plate 162b extended downward from the rear edge of horizontal plate 162a as drawn in solid lines in FIG. 14, and can be reversed to be arranged to have vertical plate 162b extended downward from the front edge of horizontal plate 162a as drawn in phantom lines in FIG. 14. Therefore, as discussed later, a position of PTO drive unit 161 can be adjusted in the fore-and-aft direction of lawn mower 1G, and in correspondence to the adjustable position of PTO drive unit 161, propeller shaft 163 is telescopic so as to adjust its length.

Horizontal plate 162a is formed with bolt holes in right and left end portions thereof. Whether connection member 162 should be arranged to have vertical plate 162b extended downward from the front edge of horizontal plate 162a or the rear edge of horizontal plate 162a is selected, and then, the right and left end portions of horizontal plate 162a are placed on top surfaces of respective right and left transaxle casings 7, and bolts 41 are screwed into the bolt holes of horizontal plate 162a, so that connection member 162 connects right and left transaxles 5 to each other.

PTO drive unit 161 includes a PTO motor casing 159 incorporating PTO electric motor 158. PTO electric motor 158 has a motor shaft 160 that projects outward from PTO motor casing 159 so as to serve as a PTO shaft. PTO motor casing 159 is fastened to vertical plate 162b is bolts 41 so that motor shaft 160 projects horizontally forward from PTO motor casing 159.

A front end of motor shaft 160 is connected to a rear end of propeller shaft 163 via a rear universal joint 163a. Input shaft 165 of mower unit 166 projects horizontally rearward from input gear box 164 and is connected at a rear end thereof to a front end of propeller shaft 163 via a front universal joint 163b. A position of PTO electric motor 158 is adjustable in the fore-and-aft direction of lawn mower 1G among positions 168, 169 and 170 shown in FIG. 14 depending on whether connection member 162 is selectively arranged to have vertical plate 162b extended downward from the front edge of horizontal plate 162a or the rear edge of horizontal plate 162a, and whether PTO motor casing 159 is selectively fixed to vertical plate 162b so as to extend forward from vertical plate 162b or rearward from vertical plate 162b. Telescopic propeller shaft 163 adjusts its length in response to any of positions 168, 169 and 170 of PTO electric motor 158.

When connection member 162 has vertical plate 162b extended downward from the rear edge of horizontal plate 162a as drawn in solid lines in FIG. 14, and PTO motor casing 159 is fixed at a rear end thereof to a front surface of vertical plate 162b so as to be cantilevered forward from vertical plate 162b as drawn in sold lines in FIG. 14, PTO electric motor 158 is disposed at normal position 168. When PTO electric motor 158 is disposed at normal position 158, at least a part of PTO electric motor 158 is disposed in motor gap space 40 so as to ensure a required equilibrium of rear-wheel driving assembly 243.

When connection member 162 has vertical plate 162b extended downward from the rear edge of horizontal plate 162a as drawn in sold lines in FIG. 14, and PTO motor casing 159 is fixed at a front end thereof to a rear surface of vertical plate 162b so as to be cantilevered rearward from vertical plate 162b as drawn in phantom lines in FIG. 14, PTO electric motor 158 is disposed at rearmost position 169 rearward from normal position 168. Rearmost position 169 is appropriate to reduction of angles 171 of universal joints 163a and 163b in comparison with normal position 168, thereby reducing load on universal joints 163a and 163b so as to improve endurance of universal joints 163a and 163b, and thereby reduce vibration and noise.

When connection member 162 has vertical plate 162b extended downward from the front edge of horizontal plate 162a as drawn in phantom lines in FIG. 14, and PTO motor casing 159 is fixed at the rear end thereof to the front surface of vertical plate 162b so as to be cantilevered forward from vertical plate 162b as drawn in phantom lines in FIG. 14, PTO electric motor 158 is disposed at foremost position 170 forward from normal position 168. PTO electric motor 158 at foremost position 170 reduces the length of propeller shaft 163 and increases angles 171 of universal joints 163a and 163b. However, when one or more batteries are mounted on horizontal plate 162a of connection member 162, PTO electric motor 158 at foremost position 170 is disposed forward from the battery or batteries so as to ensure a required equilibrium of rear-wheel driving assembly 243 with the battery or batteries in the fore-and-aft direction of lawn mower 1G.

Input gear box 164 of mower unit 166 is mounted upward on a pulley casing 167 mounted upward on a top surface of mower deck 17 incorporating left blade 18a, middle blade 18b and right blade 18c. Blade drive shaft 39a, 39b and 39c of respective blades 18a, 18b and 18c project upward from the top surface of mower deck 17. Above mower deck 17, pulley 31 is fixed on the top portion of left blade drive shaft 39a, pulley 32 is fixed on middle blade drive shaft 39b, and pulley 33 is fixed on the top portion of right blade drive shaft 39c. In the illustrated embodiment, pulley 32 on middle blade drive shaft 39b is a double pulley including upper and lower pulley members 32a and 32b.

Upper and lower pulley members 32a and 32b of pulley 32 are disposed in pulley casing 167, belt 36 is interposed between one of upper and lower pulley members 32a and 32b and pulley 31, and belt 37 is interposed between the other of upper and lower pulley members 32a and 32b and pulley 33. Middle blade drive shaft 39b further projects upward from pulley casing 167 into input gear box 164. In input gear box 164, a bevel gear (not shown) is fixed on a front end of horizontal input shaft 165, and a bevel gear (not shown) is fixed on a top end of vertical middle blade drive shaft 39b and meshes with the bevel gear on input shaft 165. Therefore, the output power of PTO electric motor 158 is transmitted to middle blade drive shaft 39b of middle blade 18b via motor shaft 160, propeller shaft 163 and input shaft 165, and is transmitted to left and right blade drive shafts 39a and 39c via belts 36 and 37, thereby synchronously driving blades 18a, 18b and 18c.

Incidentally, PTO electric motor 158 at either rearmost position 169 or foremost position 170 is disposed outward from motor gap space 40, however, is fixed to connection member 162 so as to be still disposed adjacent to a centroid of rear-wheel driving assembly 243.

Figure 17:
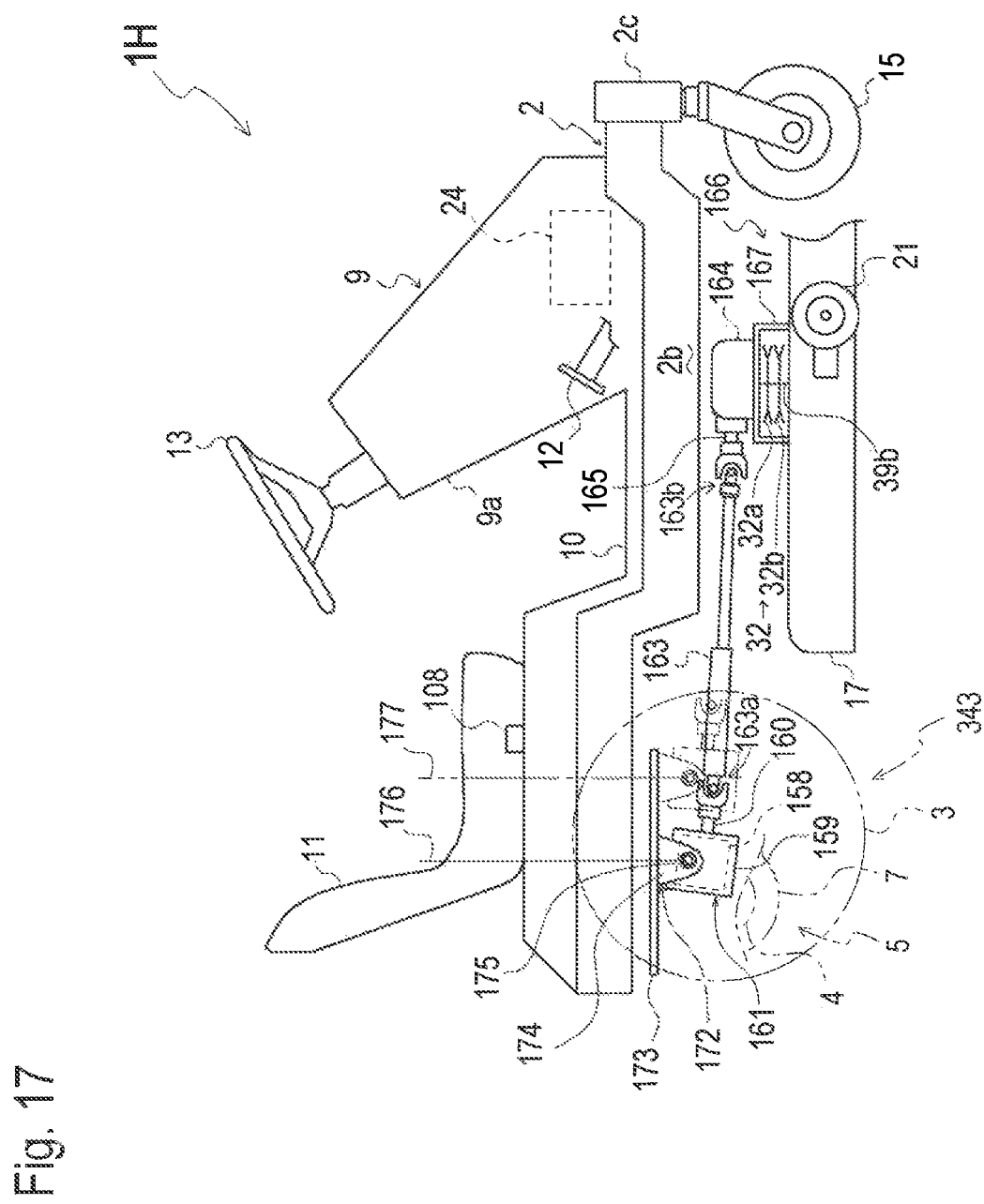
FIG. 17 is a side view of a lawn mower 1H serving as an alternative electric zero-turn working vehicle according to embodiment 1.
Figure 18:
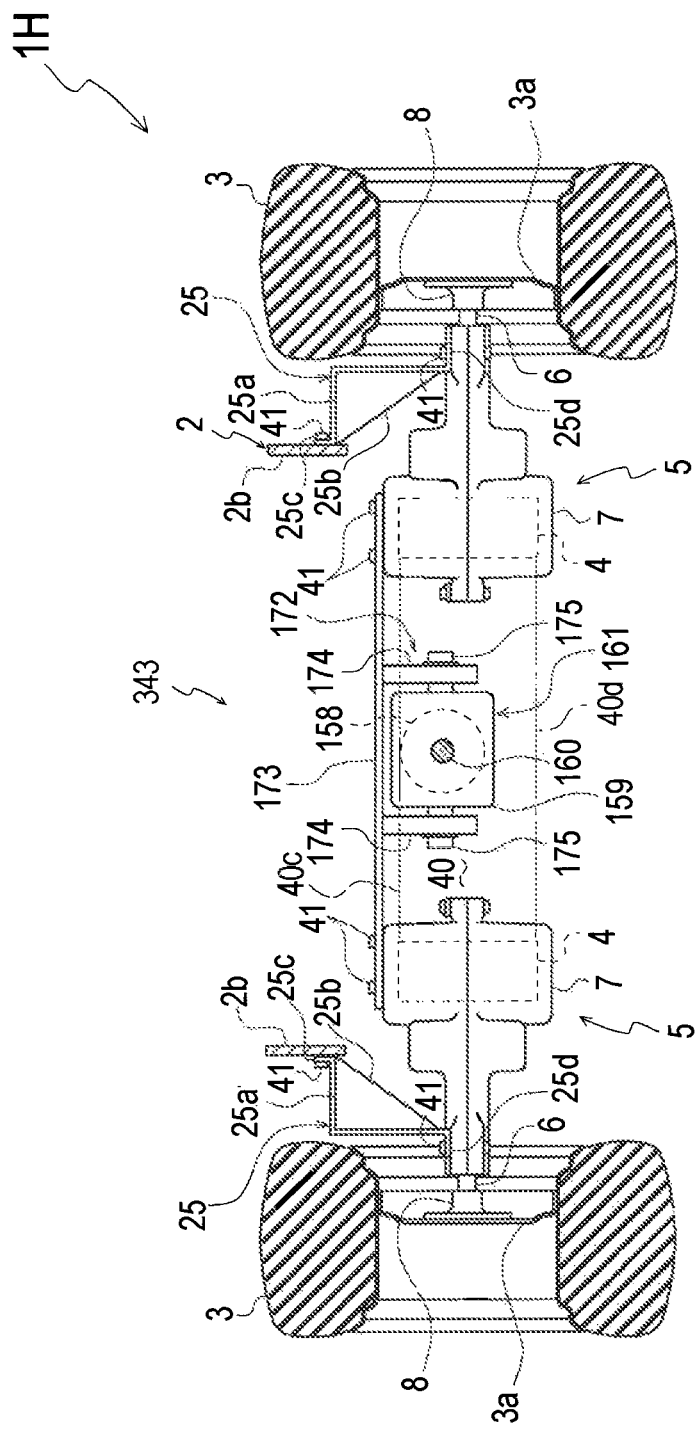
FIG. 18 is a sectional front view of lawn mower 1H, including a front view of a rear-wheel driving assembly 343.

Referring to FIGS. 17 and 18, a lawn mower 1H serves as an alternative electric zero-turn working vehicle according to embodiment 1, and serves as lawn mower 1G provided with an alternative rear-wheel driving assembly 343. Similar to rear-wheel driving assembly 243, rear-wheel driving assembly 343 includes right and left drive wheels 3, right and left transaxles 5 incorporating respective traveling electric motors 4, a connection member 173 interposed between right and left transaxles 5, and PTO drive unit 161 attached to connection member 162.

The different point of rear-wheel driving assembly 343 from rear-wheel driving assembly 243 is that connection member 173 pivotally supports PTO drive unit 161 so that PTO drive unit 161 is vertically tiltable. In this regard, connection member 173 is a horizontal plate, and is provided with a bracket 172. Bracket 172 includes a pair of right and left stays 174 that have coaxial holes and are extended downward from a lower surface of connection member 173. PTO motor casing 159 of PTO drive unit 161 is disposed between right and left stays 174. A pair of right and left trunnion pivot shafts 175 project rightwardly and leftwardly outward from respective right and left side surfaces of PTO motor casing 159, and are passed through the holes of respective right and left stays 174, thereby pivoting PTO motor casing 159 to right and left stays 174 via respective trunnion pivot shafts 175, so that PTO drive unit 161, including PTO motor casing 159 and PTO electric motor 158, is vertically tiltably centered on trunnion pivot shafts 175, whereby motor shaft 160 of PTO electric motor 158 projecting forward from PTO motor casing 159 is vertically tiltable. At least a part of PTO electric motor 158 in PTO motor casing 159 is disposed in motor gap space 40 at whichever tilt angle PTO drive unit 161 is disposed or when PTO drive unit 161 is disposed at a certain tilt angle.

PTO drive unit 161 can be fixed to stays 174 after a tilt angle of PTO drive unit 161 is determined. For example, trunnion pivot shafts 175 are threaded and nuts are screwed on the threaded portions of respective trunnion pivot shafts 175, thereby fixing trunnion pivot shafts 175 together with PTO motor casing 159 to stays 174.

Therefore, for example, when motor shaft 160 is higher than input shaft 165 of mower unit 166, the tilt angle of PTO drive unit 161 is adjusted to extend motor shaft 160 downwardly forward so as to reduce angles 171 of universal joints 163a and 163b, thereby improving endurance of universal joints 163a and 163b and reducing vibration and noise.

Incidentally, connection member 173 serves as a limiter of the tilt of PTO drive unit 161, i.e., motor shaft 160. When a front edge of a top surface of PTO motor casing 159 abuts against the lower surface of connection member 173, the tilt angle of motor shaft 160 is defined as a limit of upward tilt of motor shaft 160. When a rear edge of the top surface of PTO motor casing 159 abuts against the lower surface of connection member 173, the tilt angle of motor shaft 160 is defined as a limit of downward tilt of motor shaft 160.

Bracket 172 may be designed to extend downward from any portion of connection member 173 in the fore-and-aft direction of lawn mower 1H. For example, when bracket 172 is extended downward from a fore-and-aft intermediate portion of connection member 173 as drawn in sold lines in FIG. 17, bracket 172 is disposed at a position 176 defined to locate at least a part of PTO electric motor 158 in motor gap space 40. For example, if PTO electric motor 158 is desired to fore-and-aft balance rear-wheel driving assembly 343 with a battery or batteries mounted on connection member 173, bracket 172 may be extended downward from a front end portion of connection member 173 as drawn in phantom lines in FIG. 17, so that bracket 172 is disposed at a position 177 forward from position 176. Propeller shaft 163 is telescopically contracted so as to correspond to motor shaft 160 of PTO drive unit 161 supported by bracket 172 at position 177, in comparison with propeller shaft 163 corresponding to motor shaft 160 of PTO drive unit 161 supported by bracket 172 at position 176. Further, the tilt angle of PTO drive unit 161 supported by bracket 172 at position 177 can be adjusted to orient motor shaft 160 further downward than motor shaft 160 of PTO drive unit 161 supported by bracket 172 at position 176, thereby reducing angles of universal joints 163a and 163b in compensation for reduction of the distance between motor shaft 160 and input shaft 165 causing increase of angles of universal joints 163a and 163b.

Incidentally, PTO drive unit 161 in either lawn mower 1G or 1H may be arranged to extend motor shaft 160 rearward so that motor shaft 160 can be drivingly connected to a rear-mount working implement attached to a rear portion of lawn mower 1G or 1H. Even if PTO drive unit 161 is kept as being attached to connection member 162 or 173, motor shaft 160 can be extended rearward only by reversing connection member 162 or 173.

Figure 4:
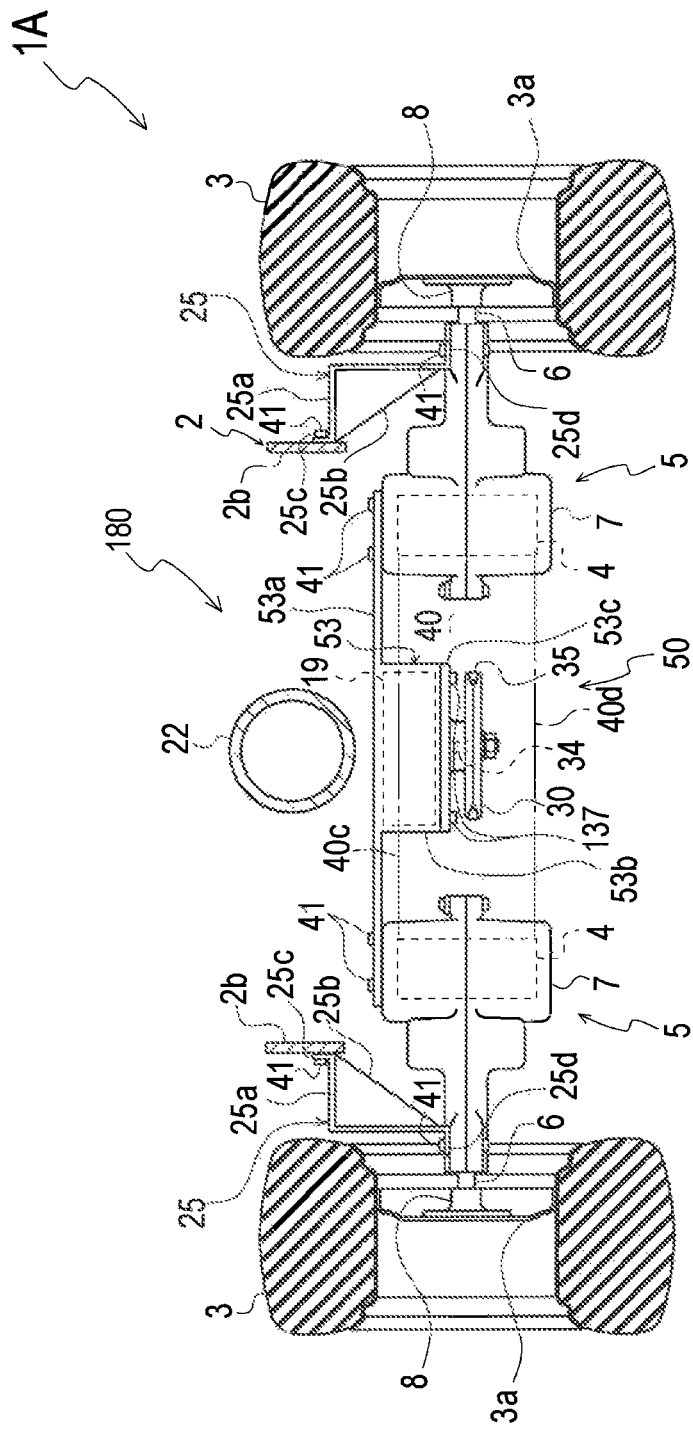
FIG. 4 is a sectional front view of a lawn mower 1A serving as an electric zero-turn working vehicle according to an embodiment 2 wherein at least a part of a PTO electric motor is disposed in a motor gap space between right and left traveling electric motors, including a front view of a rear-wheel driving assembly 180.
Figure 5:
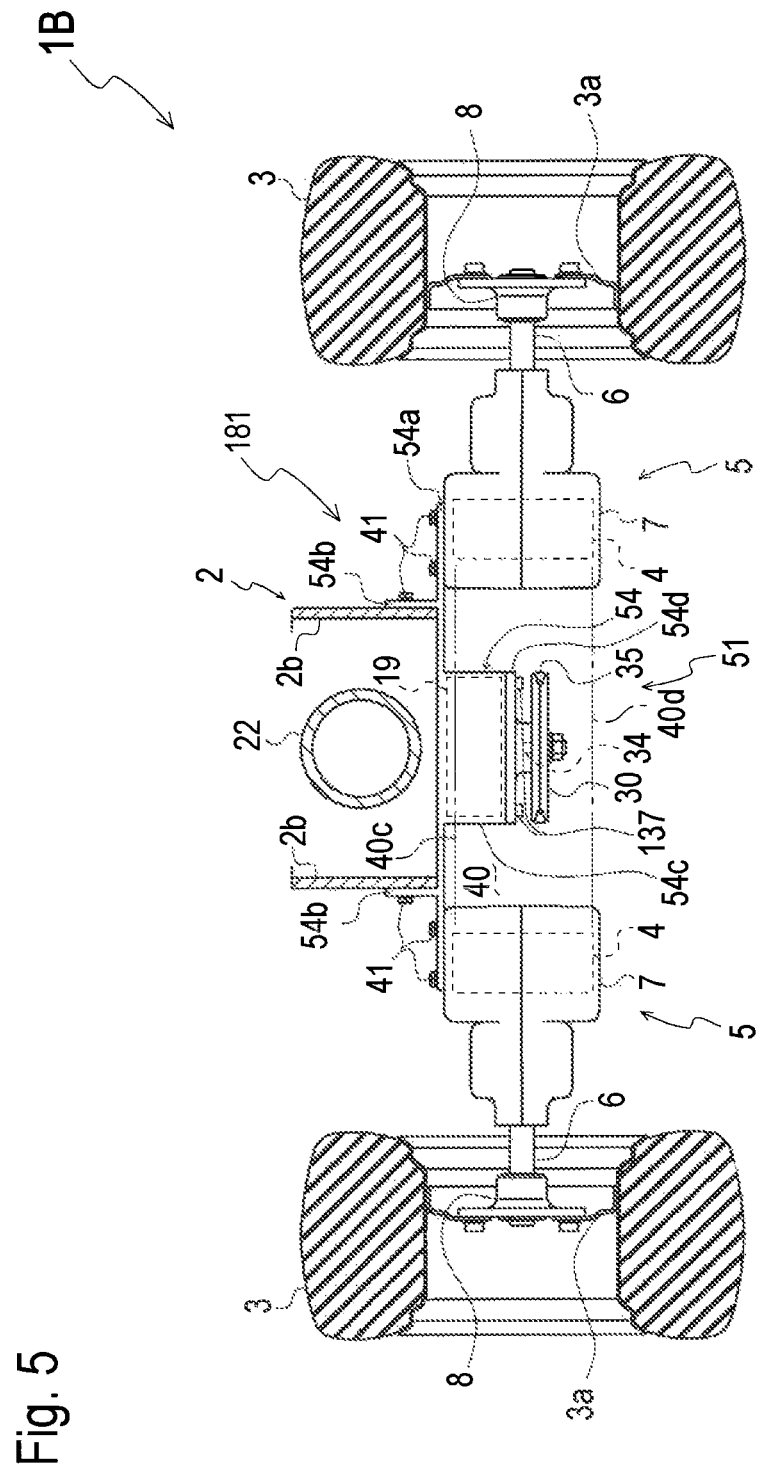
FIG. 5 is a sectional front view of a lawn mower 1B serving as an alternative electric zero-turn working vehicle according to embodiment 2, including a front view of a rear-wheel driving assembly 181.
Figure 6:
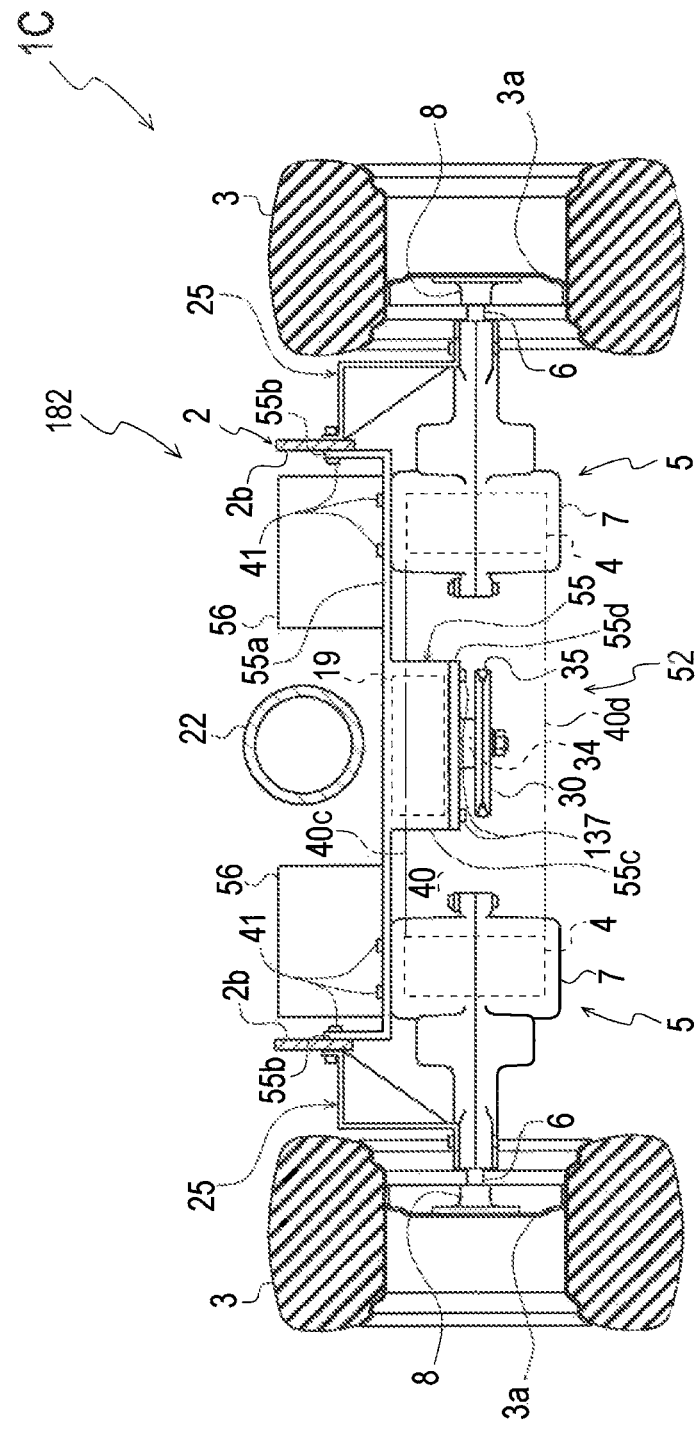
FIG. 6 is a sectional front view of a lawn mower 1C serving as an alternative electric zero-turn working vehicle according to embodiment 2, including a front view of a rear-wheel driving assembly 182.

Referring to FIGS. 4 to 6, an electric zero-turn working vehicle according to an embodiment 2 is defined as being provided with right and left independent transaxles, which are similar to those of embodiment 1, however, are connected to each other via a PTO motor casing incorporating the PTO electric motor, thereby requiring no additional connection member for connecting the right and left transaxles to each other. At least a part of the PTO electric motor is disposed in the motor gap space between the right and left traveling electric motors. Description will be given of lawn mowers 1A, 1B and 1C provided with respective PTO motor casings 53, 54 and 55 as show in FIGS. 4 to 6 so as to serve as electric zero-turn working vehicles according to embodiment 2.

Referring to FIG. 4, in lawn mower 1A, a rear-wheel driving assembly 180 includes right and left transaxles 5, right and left drive wheels 3, and a PTO drive unit 50. PTO drive unit 50 includes PTO electric motor 19 and PTO motor casing 53 incorporating PTO electric motor 19. Transaxle casings 7 of right and left transaxles 5 are attached to right and left side plates 2b of vehicle body frame 2 via right and left sub frames 25 so as to attach rear-wheel driving assembly 180 to vehicle body frame 2, similar to transaxle casings 7 in lawn mower 1. However, in rear-wheel driving assembly 180, PTO motor casing 53 of PTO drive unit 50 also serves as a connection member for connecting right and left transaxle casings 7 to each other, such as connection member 26 in lawn mower 1, thereby reducing the number of components constituting rear-wheel driving assembly 180.

PTO motor casing 53 is formed with a plate-shaped horizontal stay part 53a and a vertical cylindrical motor housing part 53b. Motor housing part 53b is extended downward from a lateral center portion of horizontal stay part 53a into motor gap space 40 between right and left traveling electric motors 4. PTO electric motor 19 is disposed in motor housing part 53b, thereby being disposed in motor gap space 40. Motor housing part 53b has a bottom opening through which an operator can access PTO electric motor 19 in motor housing part 53b. The bottom opening of motor housing part 53b is covered with a lid plate 53c. Lid plate 53c is detachably fastened to motor housing part 53b by bolts 137.

Horizontal stay part 53a of PTO motor casing 53 extends leftward and rightward from a top of motor housing part 53b. Right and left end portions of horizontal stay part 53a having bolt holes are fitted onto upper surfaces of right and left transaxle casings 7, respectively, and are fastened to transaxle casings 7 by bolts 41.

Referring to FIG. 5, in lawn mower 1B, a rear-wheel driving assembly 181 includes right and left transaxles 5, right and left drive wheels 3, and a PTO drive unit 51. PTO drive unit 51 includes PTO electric motor 19 and PTO motor casing 54 incorporating PTO electric motor 19. Transaxle casings 7 of right and left transaxles 5 are connected to each other via PTO motor casing 54, however, transaxle casings 7 are not attached to right and left side plates 2b of vehicle body frame 2. Instead, PTO motor casing 54 of PTO drive unit 51 is fixed to right and left side plates 2b of vehicle body frame 2.

PTO motor casing 54 is formed with a horizontal stay part 54a, right and left vertical stay parts 54b, and a vertical cylindrical motor housing part 54c. Motor housing part 54c is extended downward from a lateral center portion of horizontal stay part 54a into motor gap space 40 between right and left traveling electric motors 4. PTO electric motor 19 is disposed in motor housing part 54c, thereby being disposed in motor gap space 40. A lid plate 54d covers a bottom opening of motor housing part 54c and is detachably fastened to motor housing part 54c by bolts 137.

Horizontal stay part 54a of PTO motor casing 54 extends leftward and rightward from a top of motor housing part 54c. Right and left end portions of horizontal stay part 54a having bolt holes are fitted onto upper surfaces of right and left transaxle casings 7, respectively, and are fastened to transaxle casings 7 by bolts 41.

In the lateral direction of lawn mower 1B, right and left side plates 2b of vehicle body frame 2 are disposed between the right and left ends of horizontal stay part 54a of PTO motor casing 54. Correspondingly, right and left vertical stay parts 54b are extended upward from lateral intermediate portions of horizontal stay part 54a, and are fitted and fastened to respective right and left side plates 2b via bolts 41. In this way, PTO motor casing 54 serves as a connection member for connecting right and left transaxle casings 7 to each other, and also serves as a connection member for connecting rear-wheel driving assembly 181 to vehicle body frame 2, thereby requiring no additional connection member for connecting transaxle casings 7 to vehicle body frame 2, such as sub frames 25 in lawn mower 1A, and thereby further reducing the number of parts.

Referring to FIG. 6, in lawn mower 1C, a rear-wheel driving assembly 182 includes right and left transaxles 5, right and left drive wheels 3, and a PTO drive unit 52. PTO drive unit 52 includes PTO electric motor 19 and PTO motor casing 55 incorporating PTO electric motor 19. Transaxle casings 7 of right and left transaxles 5 are connected to each other via PTO motor casing 55, and transaxle casings 7 are attached to right and left side plates 2b of vehicle body frame 2 via respective right and left sub frames 25. Further, PTO motor casing 55 is also fixed to right and left side plates 2b of vehicle body frame 2.

PTO motor casing 55 is formed with a horizontal stay part 55a, right and left vertical stay parts 55b, and a vertical cylindrical motor housing part 55c. Motor housing part 55c is extended downward from a lateral center portion of horizontal stay part 55a into motor gap space 40 between right and left traveling electric motors 4. PTO electric motor 19 is disposed in motor housing part 55c, thereby being disposed in motor gap space 40. A lid plate 55d covers a bottom opening of motor housing part 55c and is detachably fastened to motor housing part 55c by bolts 137.

Horizontal stay part 55a of PTO motor casing 55 extends leftward and rightward from a top of motor housing part 55c. Right and left end portions of horizontal stay part 55a having bolt holes are fitted onto upper surfaces of right and left transaxle casings 7, respectively, and are fastened to transaxle casings 7 by bolts 41.

Right and left vertical stay parts 55b are extended upward from the respective right and left ends of horizontal stay part 55a, and are fitted and fastened to respective right and left side plates 2b via bolts 41. In this way, PTO motor casing 55 serves as a connection member for connecting right and left transaxle casings 7 to each other, and also serves as a connection member for connecting rear-wheel driving assembly 182 to vehicle body frame 2 in addition to sub frames 25 connecting transaxle casings 7 to vehicle body frame 2.

Further, horizontal stay part 55a of PTO motor casing 55 serves as a stay for mounting batteries 56 thereon. More specifically, right battery 56 is placed on an upper surface of a right portion of horizontal stay part 55a extended rightward from motor housing part 55c, left battery 56 is placed on an upper surface of a left portion of horizontal stay part 55a extended leftward from motor housing part 55c, and right and left batteries 56 are fixed to horizontal stay part 55a of PTO motor casing 55 by bolts (not shown) or so on.

Therefore, batteries 56 are mounted on rear-wheel driving assembly 182, thereby requiring no other space for arranging batteries. Further, right and left batteries 56 are heavy and are adjoined to respective right and left transaxles 5 including respective heavy right and left traveling electric motors 4, while heavy PTO electric motor 19 is disposed at an equilateral point between right and left transaxles 5 and between right and left batteries 56, thereby ensuring the equilibrium of rear-wheel driving assembly 182.

Any lawn mower serving as an electric zero-turn working vehicle according to embodiment 2 may be provided with drive wheels 3 serving as right and left front wheels, and may be provided with a front-wheel driving assembly that includes drive wheels 3, right and left transaxles having respective transaxle casings incorporating respective traveling electric motors, and a PTO motor casing incorporating a PTO electric motor and interposed between the right and left transaxle casings. Any of rear-wheel driving assemblies 180, 181 and 182 used for lawn mowers 1A, 1B and 1C can serve as the front-wheel driving assembly. In this regard, lawn mower 1F serving as an alternative electric zero-turn working vehicle according to embodiment 1 is instructive.

Further, any lawn mower serving as an electric zero-turn working vehicle according to embodiment 2 may be provided with an alternative PTO motor casing incorporating a PTO electric motor having a horizontal motor shaft, and may be provided with a propeller shaft interposed via universal joints between the motor shaft and an input shaft of a mower unit.

Further, the alternative PTO motor casing may be designed so that the position of the PTO electric motor in the fore-and-aft direction of the lawn mower can be changed only by reversing the PTO motor casing, and the propeller shaft may be telescopic to correspond to the change of the position of the PTO electric motor. In this regard, lawn mower 1G serving as an alternative electric zero-turn working vehicle according to embodiment 1 is instructive. Further, if possible, the motor shaft may be tillable as motor shaft 160 in lawn mower 1H.

Referring to FIGS. 7 to 11, an electric zero-turn working vehicle according to an embodiment 3 is provided with a transaxle having a single transaxle casing supporting both axles of right and left drive wheels. Right and left traveling electric motors for driving the respective right and left axles and a PTO electric motor for driving a working implement are disposed in the transaxle casing, thereby reducing the number of parts.

Figure 7:
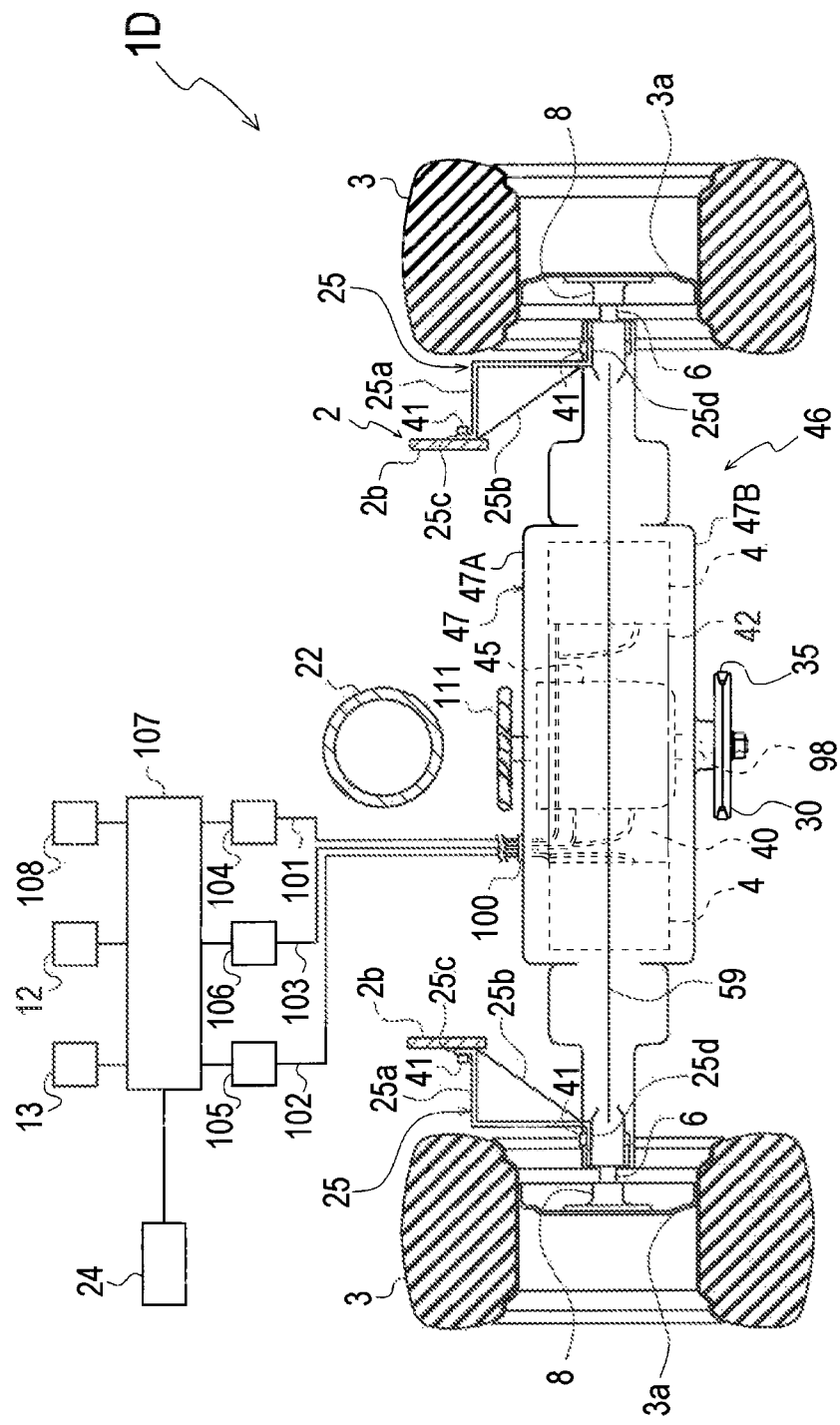
FIG. 7 is a sectional front view of a lawn mower 1D serving as an electric zero-turn working vehicle according to an embodiment 3 wherein at least a part of a PTO electric motor is disposed in a motor gap space between right and left traveling electric motors, including a front view of transaxle 46.

Lawn mower 1D serving as an electric zero-turn working vehicle according to embodiment 3 will be described with reference to FIGS. 7 to 9. Lawn mower 1D is provided with a transaxle 46 for driving right and left drive wheels 3. Transaxle 46 includes a single transaxle casing 47 supporting right and left axles 6 of respective right and left drive wheels 3. Transaxle casing 47 incorporates right and left traveling electric motors 4 and PTO electric motor 19. Therefore, transaxle 46 with right and left drive wheels 3 serves as aforesaid rear-wheel driving assemblies 43, 180, 181 and 182, and is detachably attached to vehicle body frame 2 by attaching right and left end portions of transaxle casing 47 to right and left side plates 2b via right and left sub frames 25.

Transaxle casing 47 includes an upper casing half 47A and a lower casing half 47B, which are joined to each other at a horizontal joint plane 59 and are fastened to each other via bolts 48 so as to constitute transaxle casing 47. Right and left traveling electric motors 4R and 4L has respective motor shafts 49 serving as output shafts. Motor shafts 49 of respective right and left electric motors 4R and 4L and axles 6 of respective right and left drive wheels 3 are clamped between upper and lower casing halves 47A and 47B via respective bearings, so as to be journalled by transaxle casing 47. In other words, axes of respective right and left motor shafts 49 and axes of respective right and left axles 6 are disposed on joint plane 59. Right and left motor shafts 49 and right and left axles 6 are extended in the lateral direction of lawn mower 1D and parallel to one another, and right and left axles 6 are offset forward or rearward (in this embodiment, forward) from right and left motor shafts 49.

Transaxle casing 47 completed by joining transaxle casing halves 47A and 47B is externally formed with a lateral extended middle portion 68, with right and left gear support portions 63 on right and left ends of middle portion 68, and with right and left axle support portions 64 extended laterally distally from front portions of respective right and left gear support portions 63. Middle portion 68 is formed so as to define a motor chamber 65 therein. Each of right and left gear support portions 63 is formed to support gears of corresponding reduction gear train 67 and a later-discussed corresponding brake mechanism 86, and each of right and left axle support portions 64 is formed to support corresponding axle 6 and a later-discussed clutch mechanism 87. Right gear support portion 63 and right axle support portion 64 are joined in an L-shape in plan view so as to define a right gear chamber 66 therein. Similarly, left gear support portion 63 and left axle support portion 64 are joined to define a left gear chamber 66 therein.

Transaxle casing 47 is formed therein with right and left partition walls 61 so as to define right and left gear chambers 66 and motor chamber 65 between right and left gear chambers 66. In this regard, FIG. 8 illustrates only a representative left part of motor chamber 65 and representative left gear chamber 66. Right and left traveling electric motors 4 are disposed in motor chamber 65 along respective right and left partition walls 61, and a PTO electric motor 45 for driving blades of mower unit 16 (or 135 or 166) is disposed in motor chamber 65 between right and left traveling electric motors 4. Motor shafts 49 are extended laterally distally outward from respective right and left traveling electric motors 4, and outward from transaxle casing 47 through respective right and left partition walls 61 and through right and left gear chambers 66, so as to be fixedly provided on tips thereof with respective cooling fans 60. Partition walls 61 are formed with holes (not shown) so as to allow fluid in transaxle casing 47 to flow through partition walls 61 between motor chamber 65 and right and left gear chambers 66. The fluid lubricates gears in gear chambers 66 and cools electric motors 4 and 45 in motor chamber 65. As shown in FIG. 9, the fluid becomes a fluid sump having a level 109 in motor chamber 65 as discussed later.

Figure 8:
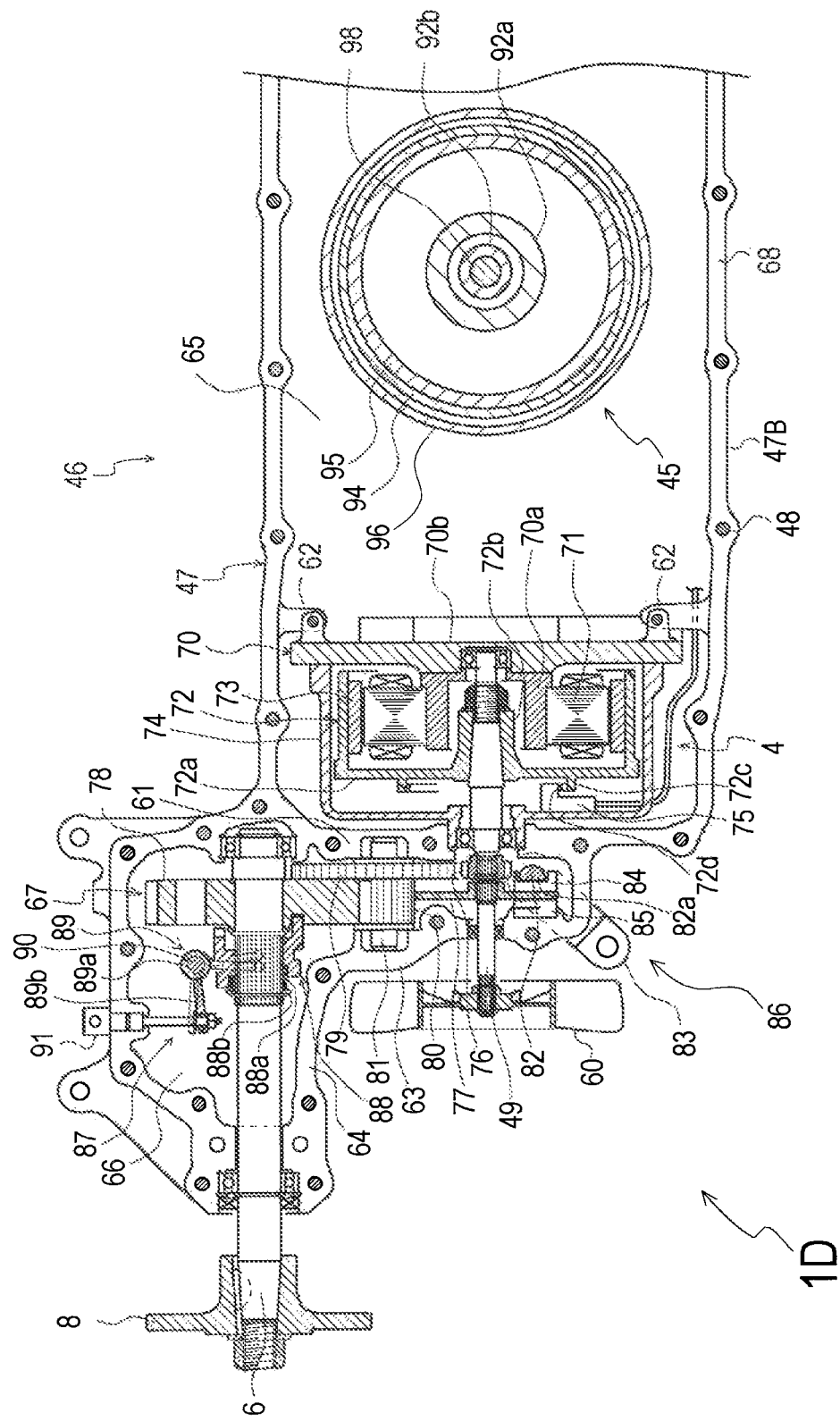
FIG. 8 is a sectional plan view of a representative left half portion of transaxle 46 of lawn mower 1D.

Each of traveling electric motors 4 will be described with reference to FIG. 8 showing only representative left traveling electric motor 4. Traveling electric motor 4 includes a stator 70 having armature windings 71, a rotor 72 having magnets 73, and a motor shaft frame 74. Stator 70 includes a cylindrical stator core 70a and a discoid stator plate 70b. Stator core 70a is coaxially disposed around motor shaft 49, and stator plate 70b is fixed on an end of stator core 70a. Stator plate 70b is extended vertically and journals horizontal motor shaft 49 via a bearing. Transaxle casing 47 is formed with stays 62 in motor chamber 65, and stator plate 70b is fastened to stays 62 via bolts. Armature windings 71 are fixed on an outer peripheral surface of stator core 70a.

Rotor 72 is formed with a cup-shaped part 72a and a center boss 72b. Cup-shaped part 72a is opened at one axial end thereof toward stator plate 70b, and cup-shaped part 72a is closed at the other axial end thereof so as to have a vertical end surface, so that a cylindrical portion of cup-shaped part 72a between the opposite axial ends thereof surrounds stator core 70a and armature windings 71 on stator core 70a. Center boss 72b is fixed at an inner peripheral surface thereof onto motor shaft 49, and is surrounded at an outer peripheral surface thereof by an inner peripheral surface of stator core 70a. Magnets 73 are fixed on an inner peripheral surface of cup-shaped part 72a of rotor 72 so as to face armature windings 71.

Figure 21:
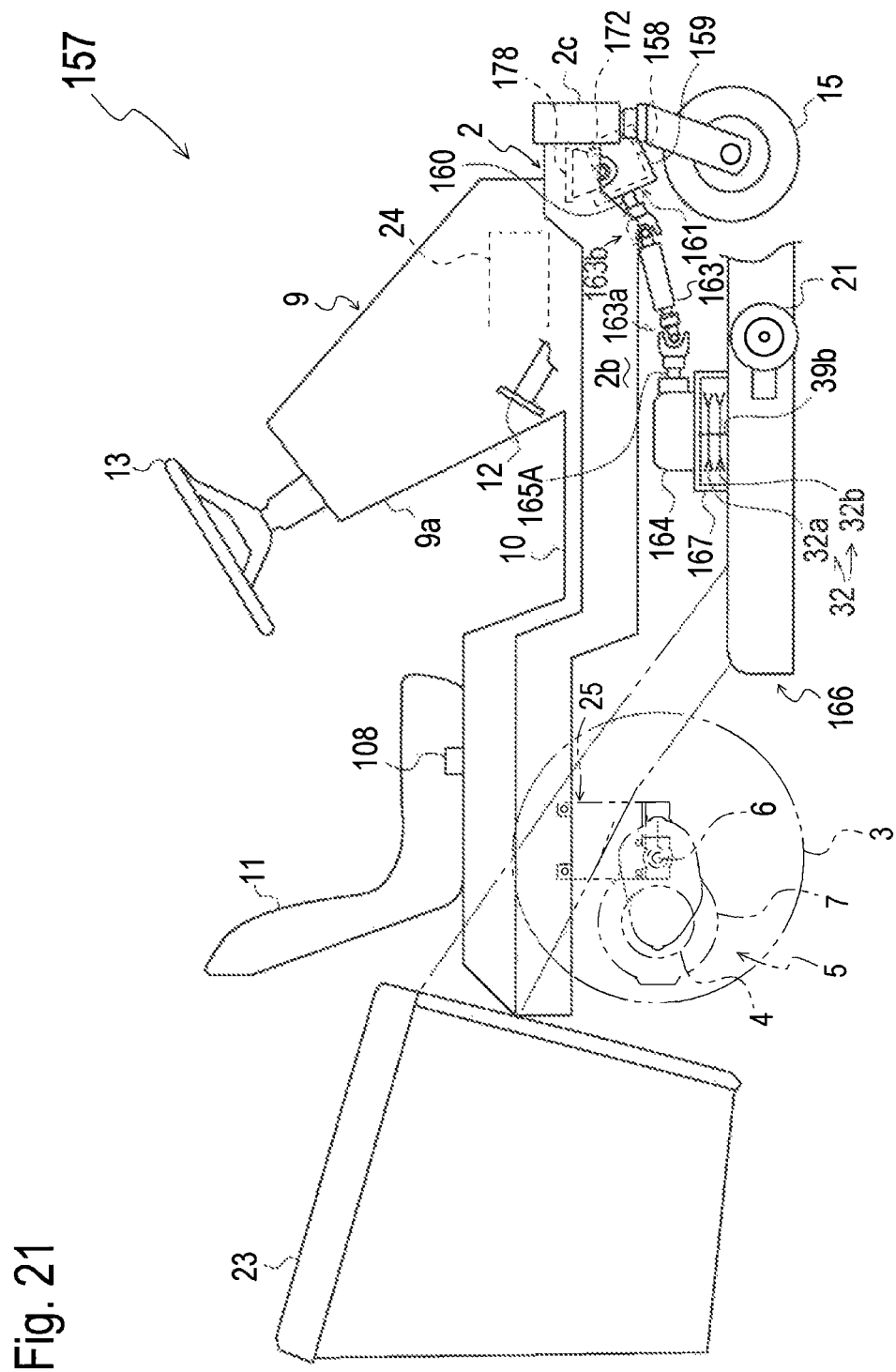
FIG. 21 is a side view of a lawn mower 157 serving as an electric zero-turn working vehicle according to another embodiment wherein a PTO electric motor is disposed outward from a motor gap space between right and left traveling electric motors.
Figure 22A:
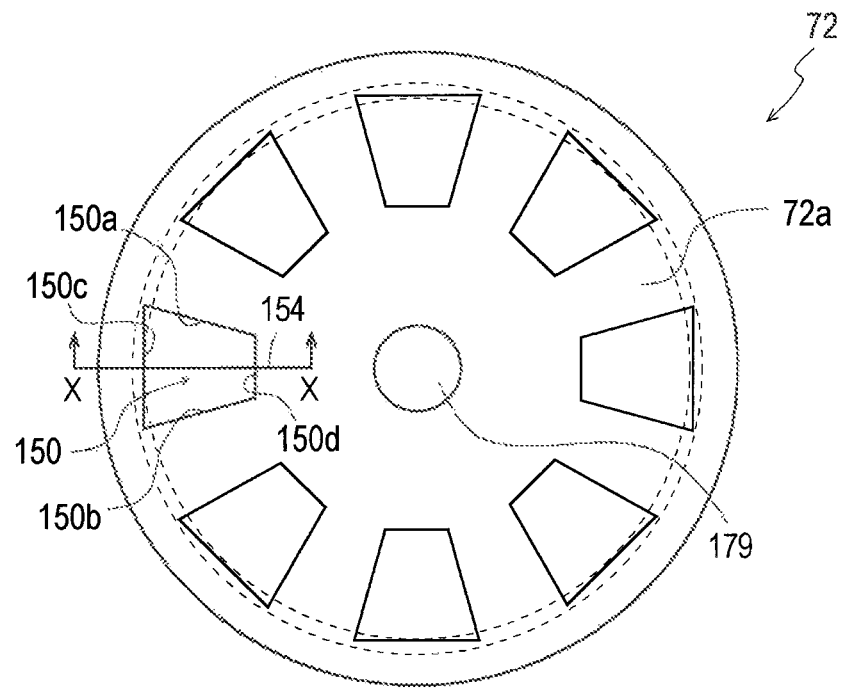
FIG. 22($a$) is a side view of a rotor 72 for traveling electric motor 4 incorporated by transaxle 46 in lawn mower 1D.
Figure 22B:
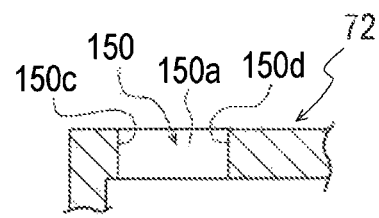

Incidentally, as shown in FIGS. 22(a) and 22(b), rotor 72 is formed in the vertical end surface of cup-shaped part 72a with radiation holes 150 for radiating heat from armature windings 71 surrounded by cup-shaped part 72a. In this regard, traveling electric motor 4 is soaked at a lower portion thereof in the fluid sump having level 109 in motor chamber 65. During rotation of rotor 72 of traveling electric motor 4, the fluid sump is agitated because fluid of the fluid sump is carried by each radiation hole 150 when each radiation hole 150 moves in the fluid sump. The agitation resistance of the fluid sump causes power loss and heat of traveling electric motor 4, thereby reducing the efficiency of radiation of heat. Therefore, rotor 72 of traveling electric motor 4 having horizontal motor shaft 49 and disposed in wet motor chamber 65 of transaxle casing 47 for lawn mower 1D is desired to have its radiation holes in the vertical end surface of cup-shaped part 72a improved to reduce agitation resistance of fluid. Some recommended rotors for solving this problem of traveling electric motor 4 in lawn mower 1D will be discussed later after description of all lawn mowers shown in FIGS. 1 to 21 is finished.

Motor shaft frame 74 is arched across rotor 72 and is fixed to stator plate 70b. Motor shaft frame 74 journals motor shaft 49 via a bearing. Motor shaft frame 74 is opened (not shown) to motor chamber 65 so as to expose rotor 72 and armature windings 71 to fluid in motor chamber 65, thereby cooling rotor 72 and armature windings 71.

Cup-shaped part 72a is formed with an annular convex 72c, which is extended toward partition wall 61 so as to surround motor shaft 49. Detected targets 72d are fixed on an inner peripheral surface of annular convex 72c. A rotary speed sensor 75 is disposed inside of motor shaft frame 74 so as to face detected targets 72d on the inner peripheral surface of annular convex 72c of rotor 72. Rotary speed sensor 75 detects detected targets 72d during rotation of rotor 72 so as to recognize an actual rotational position of certain one of magnets 73, and transmits a signal regarding the actual rotational position of magnet 73 to a controller 107. Controller 107 controls a current direction of armature windings 71 in response to the detection of actual rotational position of magnet 73, thereby controlling rotation of rotor 72, i.e., rotation of motor shaft 49.

Reduction gear train 67 in each of gear chambers 66 for transmitting power from motor shaft 49 to axle 6 will be described with reference to FIG. 8 showing only representative reduction gear train 67 in left gear chamber 66. In gear chamber 66, a motor output gear 76 and a brake rotor 77 are fixed on motor shaft 49. Axle 6 supported in axle support portion 64 is provided on a lateral proximal end portion thereof with a final gear 78 so as to be rotatable relative to final gear 78. A counter shaft 81 is extended in the lateral direction of lawn mower 1D, and is supported in gear chamber 66 between motor shaft 49 and axle 6. Diametric large and small gears 79 and 80 are integral with each other and are provided on counter shaft 81. Diametric large gear 79 meshes with motor output gear 76, and diametric small gear 80 meshes with final gear 78. In this way, gears 76, 79, 80 and 78 constitute reduction gear train 67.

Transaxle 46 includes a pair of right and left brake mechanisms 86 for respective right and left axles 6. Each brake mechanism 86 includes a vertical brake camshaft 82, a brake shoe 84, a brake pad 85 and brake rotor 77. Right and left vertical brake camshafts 82 are pivoted in respective right and left gear chambers 66, and project outward from transaxle casing 47 so as to be fixedly provided on respective end portions thereof with respective brake arms 83, which are connected to a brake operation device provided on lawn mower 1D.

Brake shoe 84 and brake pad 85 are disposed in each gear chamber 66, so that brake shoe 84 is disposed between a cam surface 82a of brake camshaft 82 and brake rotor 77, and brake rotor 77 is disposed between brake shoe 84 and brake pad 85. When brake camshaft 82 is set for unbraking, cam surface 82a is disposed parallel to brake shoe 84 so that brake rotor 77 is free from brake shoe 84 and brake pad 85. When brake camshaft 82 is set for braking, cam surface 82a is slanted relative to brake shoe 84 so as to press brake shoe 84 against brake rotor 77, thereby nipping brake rotor 77 between brake shoe 84 and brake pad 85, and thereby braking motor shaft 49.

A clutch mechanism 87 for isolating axle 6 from a torque of motor shaft 49 is disposed in each gear chamber 66. Clutch mechanism 87 includes a clutch member 88, a spring 88a, a retaining ring 88b, a fork 89, a vertical fork pivot shaft 90 and a horizontal push-pull pin 91. Clutch member 88 is splinefitted on axle 6 so as to be unrotatable relative to axle 6 and so as to be slidable on axle 6 in the axial direction of axle 6. Clutch member 88 is formed with projections that can be fitted into recesses formed in final gear 78. Retaining ring 88b is fixed on axle 6, and spring 88a is interposed between clutch member 88 and retaining ring 88b so as to bias clutch member 88 toward final gear 78. Due to the force of spring 88a, the projections of clutch member 88 are normally fitted into the recesses of final gear 78 so as to rotatably integrate axle 6 with final gear 78. Clutch mechanism 87 in this state is defined as being clutched on.

Clutch member 88 is formed with an annular groove into which fork 89 is fitted. A boss 89a formed on fork 89 is pivotally fitted on vertical fork pivot shaft 90, and an arm 89b is extended from boss 89a and is connected to horizontal push-pull pin 91. Push-pull pin 91 is horizontally reciprocally movably fitted through a front wall of each of right and left axle support portions 64 of transaxle casing 47. When push-pull pin 91 is pulled, clutch member 88 is pulled against spring 88a so as to remove the projections of clutch member 88 from the recesses of final gear 78, thereby allowing axle 6 to rotate relative to final gear 78, i.e., isolating axle 6 from a torque of motor shaft 49. Clutch mechanism 87 in this state is defined as being clutched off.

When lawn mower 1D is towed, armature windings 71 of right and left traveling electric motors 4 are unexcited, however, if clutch mechanisms 87 are clutched on, rotation of each motor shaft 49 following rotation of corresponding axle 6 causes a cogging torque of each of traveling electric motors 4, thereby resisting rotation of drive wheels 3 during towing of lawn mower 1D. Therefore, right and left push-pull pins 91 are pulled to clutch off right and left clutch mechanisms 87 so as to isolate axles 6 from the cogging torques of motor shafts 49, thereby ensuring smooth rotation of right and left drive wheels 3 during towing of lawn mower 1D.

The above-mentioned mechanism in gear chamber 66, including reduction gear train 67, brake mechanism 86 and clutch mechanism 87, is adaptable as a mechanism in each of transaxle casings 7 of right and left transaxles 5 or 131 in each of aforesaid lawn mowers 1, 1A, 1B, 1C, 1F, 1G and 1H and of later-described lawn mowers 145 and 157.

Figure 9:
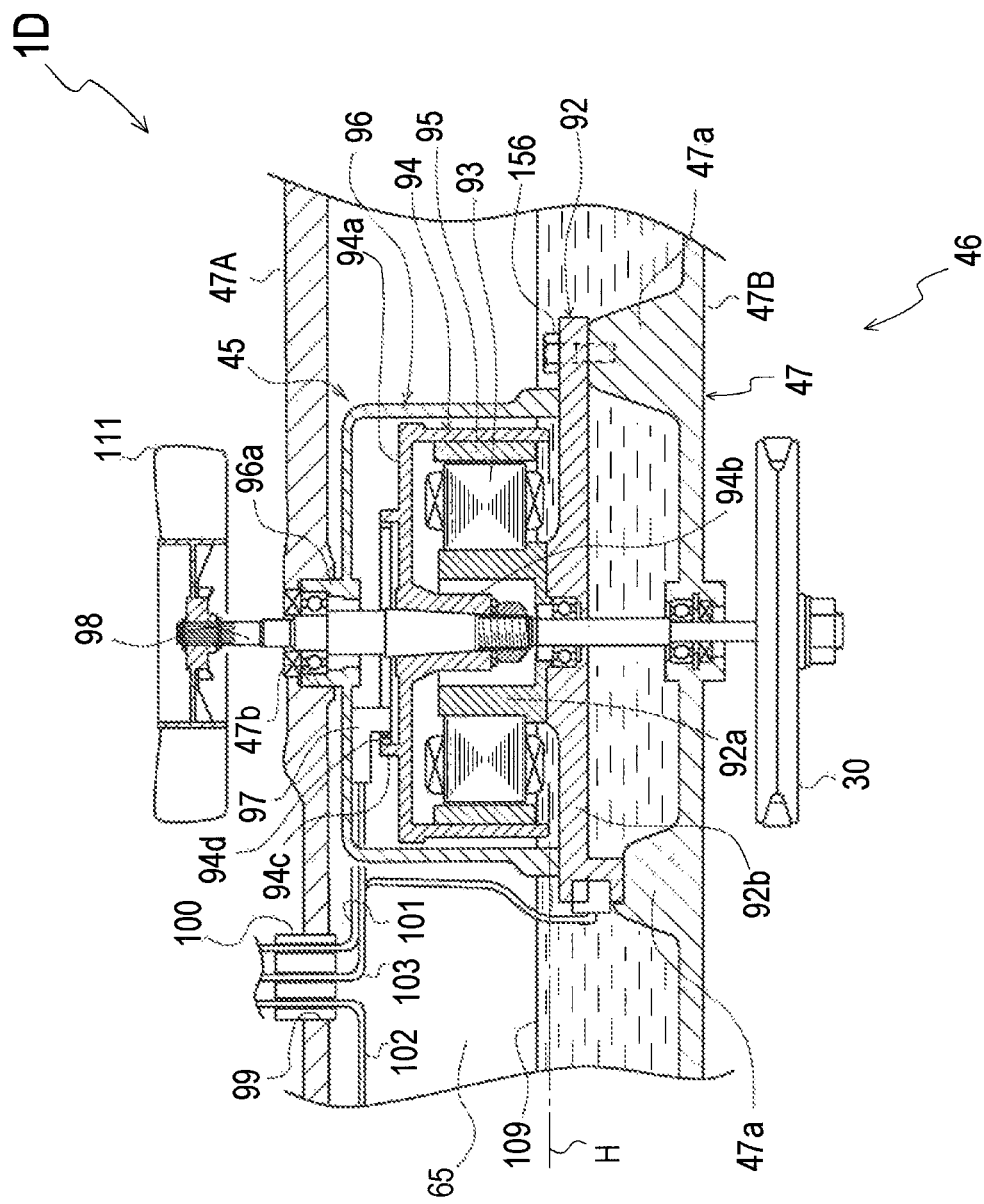
FIG. 9 is a sectional front view of a center portion of transaxle 46 of lawn mower 1D.

Referring to FIG. 9, PTO electric motor 45 of transaxle 46 will be described. PTO electric motor 45 includes a stator 92 having armature windings 93, a rotor 94 having magnets 95, a motor shaft frame 96, and a vertical motor shaft 98. Stator 92 includes a stator core 93a and a stator plate 93b, and rotor 94 includes a cup-shaped part 94a and center boss 94b. Stator 92, rotor 94 and motor shaft frame 96 are provided on motor shaft 98, armature windings 93 are provided on stator 92, and magnets 95 are provided on rotor 94, similar to corresponding members of traveling electric motor 4. Further, cup-shaped part 94a of rotor 94 is formed with an annular convex 94c, and is provided with detected targets 94d on an inner peripheral surface of annular convex 94c, and PTO electric motor 45 is provided with a rotary speed sensor 97 facing detected targets 94d, similar to the corresponding members and parts of traveling electric motor 4.

Motor shaft frame 96 surrounding rotor 94 has an opening opened to motor chamber 65 at a bottom portion of motor shaft frame 96 adjacent to stator plate 92b so as to expose rotor 94 and armature windings 93 to the fluid in motor chamber 65. In this regard, a level 109 of the fluid sump in transaxle casing 47 is a little higher than a height H of the bottom opening of motor shaft frame 96, so that the height of level 109 is lowered to minimize agitation resistance of the fluid sump, however, is sufficient to lubricate the gears in gear chambers 66 and to cool electric motors 4 and 45 in motor chamber 65.

Stator plate 92b is extended horizontally so as to serve as a bottom plate of PTO electric motor 45, and journals vertical motor shaft 98 via a bearing. Motor support projections 47a project upward from a bottom wall of transaxle casing 47, i.e., lower transaxle casing half 47B. Stator plate 92b is fitted at a lower surface thereof onto top surfaces of respective motor support projections 47a, and is fastened to motor support projections 47a via bolts 156. Motor shaft 98 is extended downward from stator plate 92b, is journalled via a bearing by the bottom wall of transaxle casing 47, i.e., lower transaxle casing half 47B, and is further extended downward from the bottom of transaxle casing 47, i.e., lower transaxle casing half 47B, so as to be fixedly provided on a bottom end thereof with PTO pulley 30.

On the other hand, motor shaft frame 96 is formed at a top portion thereof with a center boss 96a that journals motor shaft 98 via a bearing. Center boss 96a projects upward and is fitted into a hole 47b formed in a top wall of transaxle casing 47, i.e., upper transaxle casing half 47A. Motor shaft 98 projects upwardly outward from the top wall of transaxle casing 47, i.e., upper transaxle casing half 47A, so as to be fixedly provided on a top end thereof with a cooling fan 111. Therefore, while PTO electric motor 45 is driven, cooling fan 111 is rotated to blow air to transaxle casing 47, thereby effectively cooling electric motors 4 and 45 in motor chamber 65 via transaxle casing 47 and the fluid in motor chamber 65.

In this way, PTO electric motor 45 is disposed in motor chamber 65 formed in transaxle casing 47, thereby being disposed in motor gap space 40 between right and left traveling electric motors 4R and 4L so as to ensure an equilibrium of transaxle 46.

A portion of transaxle casing 47 (in this embodiment, upper transaxle casing half 47A) facing motor chamber 65 is formed with a through hole 99 between the outside of transaxle casing 47 and motor chamber 65, and a wire-passing cap 100 is fluid-tightly fitted into through hole 99. Wires connected to armature windings 71 and rotary speed sensor 75 in left traveling electric motor 4 are bundled as a first harness 101, wires connected to armature windings 71 and rotary speed sensor 75 in right traveling electric motor 4 are bundled as a second harness 102, and wires connected to armature windings 93 and rotary speed sensor 97 in PTO electric motor 45 are bundled as a third harness 103. First, second and third harnesses 101, 102 and 103 are fluid-tightly passed through wire-passing cap 100. Harnesses 101, 102 and 103 are extended into motor chamber 65 from wire-passing cap 100 so as to be connected to the relevant members of respective electric motors 4 and 45, and are extended to the outside of transaxle casing 47 from wire-passing cap 100 so as to be connected to respective drivers 104, 105 and 106 that are connected to controller 107 for controlling right and left traveling electric motors 4 and PTO electric motor 45. Further, steering wheel 13, accelerator pedal 12 and mower operation device 108 are provided with respective operation sensors for detecting operational positions thereof, and the sensors are electrically connected to controller 107. Further, battery 24 is electrically connected to controller 107.

Each of drivers 104, 105 and 106 includes an inverter and a transmitter-receiver. Controller 107 controls the inverters of respective drivers 104, 105 and 106 based on electric signals from the operation sensors of steering wheel 13, accelerator pedal 12 and mower operation device 108, and electric signals from rotary speed sensors 75 and 97 of respective electric motors 4 and 45, so that each of electric motors 4 and 45 has current flowing in its armature windings 71 or 93 in response to the control of corresponding driver 104, 105 or 106.

Lawn mower 1E serving as an alternative electric zero-turn working vehicle according to embodiment 3 will be described with reference to FIGS. 10 and 11. Lawn mower 1E has a transaxle 110 that includes a single transaxle casing 112 supporting axles 6 of respective right and left drive wheels 3R and 3L and incorporating all traveling and PTO electric motors 113 and 114, similar to transaxle casing 47 of lawn mower 1D, however, transaxle casing 112 of lawn mower 1E includes right and left gear housings 122 and a motor housing 120 interposed between right and left gear housings 122.

Right and left gear housings 122 support respective right and left axles 6, and are formed therein with respective gear chambers 186 each of which incorporates reduction gear train 67, brake mechanism 86 and clutch mechanism 87. Motor housing 120 is formed therein with a motor chamber 185 incorporating right and left traveling electric motors 113 and PTO electric motor 114. Motor gap space 40 is defined by right and left traveling electric motors 113 so as to be extended in motor chamber 185 between right and left traveling electric motors 113. PTO electric motor 114 is disposed in motor chamber 185 so that at least a part of PTO electric motor 114 is disposed in motor gap space 40. Incidentally, FIGS. 10 and 11 shows only a representative left portion of transaxle 110 including left traveling electric motor 113 and left gear housing 122 supporting left axle 6 and incorporating left reduction gear train 67, left brake mechanism 86 and left clutch mechanism 87.

Figure 10:
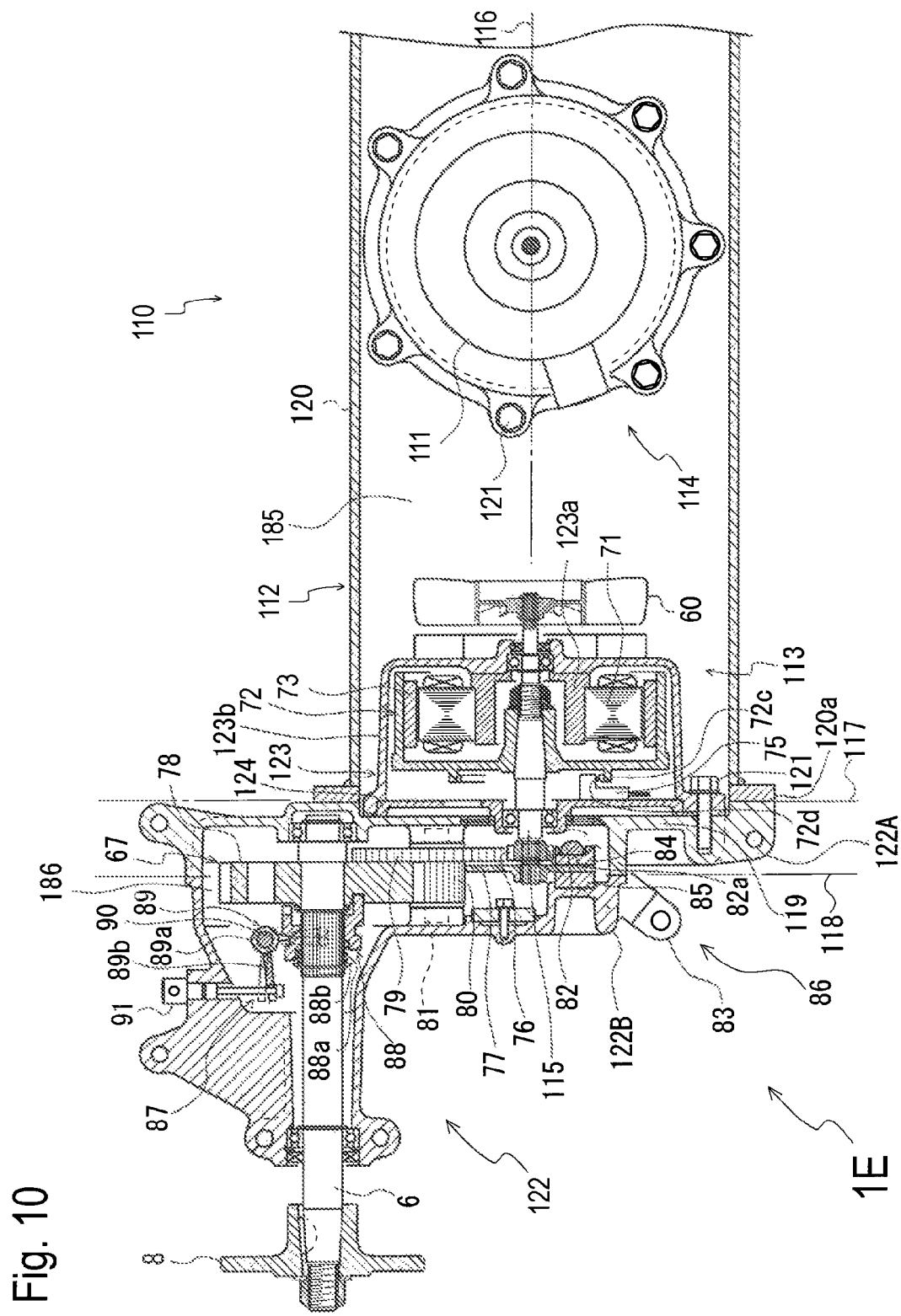
FIG. 10 is a sectional plan view of a representative left half portion of a transaxle 110 of a lawn mower 1E serving as an alternative electric zero-turn working vehicle according to embodiment 3.
Figure 11:
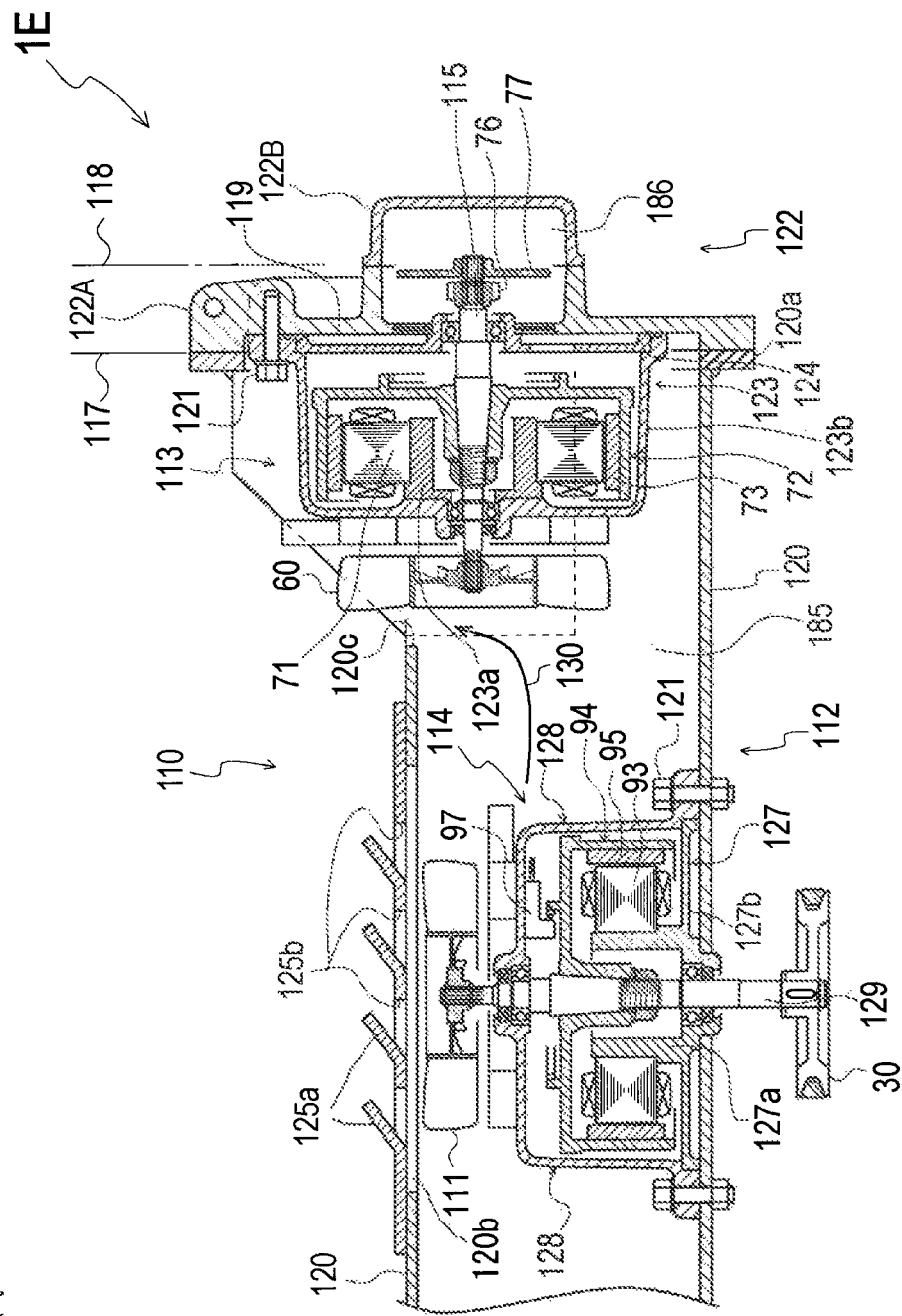
FIG. 11 is a sectional front view of the representative left half portion of transaxle 110 of lawn mower 1E.

Further, as shown in FIGS. 10 and 11, each gear housing 122 includes a proximal housing part 122A and a distal housing part 122B joined to each other at a vertical joint plane 118 extended in the fore-and-aft direction of lawn mower 1E. Motor housing 120 is fixedly provided on right and left open ends thereof with respective flanges 120a. Each of right and left flanges 120a is joined to proximal housing part 122A of each of right and left gear housings 122 at a vertical joint plane 117 extended in the fore-and-aft direction of lawn mower 1E.

In FIGS. 10 and 11, motor housing 120 appears as a single cylindrical member with right and left flanges 120a. Alternatively, motor housing 120 may be dividable. For example, motor housing 120 may include front and rear housing halves joined to each other at a vertical joint plane 116 extended in the lateral direction of lawn mower 1E as show in FIG. 10.

Each traveling electric motor 113 will be described with only reference to its features different from corresponding features of traveling electric motor 4. Traveling electric motor 113 includes a horizontal motor shaft 115 extended in the lateral direction of lawn mower 1E. A distal end of motor shaft 115 is disposed in gear chamber 186 so as to be fixedly provided thereon with motor output gear 76 and brake rotor 77. A proximal end of motor shaft 115 projects from traveling electric motor 113 and is disposed in motor chamber 185 so as to be fixedly provided thereon with cooling fan 60.

A stator 123 of each traveling electric motor 113 includes a cylindrical stator core 123a coaxially disposed around motor shaft 115. Stator 123 further includes a cup-shaped part 123b. Cup-shaped part 123b is extended vertically from a proximal end of stator core 123a, and is curved and extended laterally distally toward corresponding gear housing 122 so as to surround rotor 72 fixed on motor shaft 115. Cup-shaped part 123b is formed on a distal end thereof with a flange that is fastened to proximal housing part 122A of gear housing 122 via bolts 121. A motor shaft support plate 124 is extended vertically along vertical joint plane 117 and is fittingly clamped between the distal end of cup-shaped part 123b of stator 123 and proximal housing part 122A of gear housing 122. Rotary speed sensor 75 is fixed on motor shaft support plate 124 so as to face detected targets 72d on rotor 72. Motor shaft support plate 124 and the vertical plate portion of cup-shaped part 123b of stator 123 journal motor shaft 115 via respective bearings.

PTO electric motor 114 will be described only with reference to its features different from corresponding features of PTO electric motor 45. PTO electric motor 114 includes a vertical motor shaft 129. PTO electric motor 114 includes a cup-shaped motor shaft frame 128 that journals motor shaft 129 at a horizontal top portion thereof via a bearing. Rotary speed sensor 97 is fixed to a lower surface of the horizontal top portion of motor shaft, frame 128 and so as to face detected targets on a top portion of rotor 94. Motor shaft frame 128 is curved to extend vertically downward so as to surround rotor 94, and is formed on a bottom end thereof with a flange that is fastened to a bottom portion of motor housing 120 via bolts 121. A stator 127 of PTO electric motor 114 is formed with a vertical cylindrical core 127a having an outer peripheral surface on which armature windings 93 are fixed. Stator 127 is formed with a horizontal plate 127b extended along the bottom portion of motor housing 120, and horizontal plate 127b of stator 127 is fittingly clamped between the bottom end portion of motor shaft frame 128 and the bottom portion of motor housing 120. In motor chamber 185, cooling fan 111 is fixed on a top end of motor shaft 129 projecting upward from the top portion of motor shaft frame 128. Motor shaft 129 is extended downwardly outward from the bottom of motor housing 120 via the horizontal plate of stator 127, and is fixedly provided on a bottom end thereof with PTO pulley 30.

Motor chamber 185 is a dry chamber that is not supplied therein with fluid. Air is introduced from the outside of transaxle casing 112 into motor chamber 185 so as to cool PTO electric motor 114 and right and left traveling electric motors 113. In this regard, an opening 120b is formed in a lateral middle portion of a ceiling wall portion of motor housing 120 so as to face cooling fan 111 therebelow. A fin cover 125 is fixed to motor housing 120 so as to cover opening 120b. Fin cover 125 is formed with fins 125a and is formed with slits 125b along respective fins 125a. When PTO electric motor 114 is driven, cooling fan 111 rotates with motor shaft 129 so as to introduce air into motor chamber 185 through slits 125b and opening 120b, and so as to blow the air downward, thereby cooling PTO electric motor 114.

Further, motor housing 120 is formed at right and left upper portions thereof with a pair of right and left openings 120c surrounding upper portions of respective traveling electric motors 113. When each traveling electric motor 113 is driven, cooling fan 60 rotates with motor shaft 115 so as to introduce air from a space above motor housing 120 through opening 120c, and so as to blow the air laterally to traveling electric motor 113, thereby cooling traveling electric motor 113. Further, when cooling fan 111 rotates, cooling fan 60 introduces the air blown from cooling fan 111 of PTO electric motor 114 toward traveling electric motor 113. Therefore, a cooling air passage 130 from PTO electric motor 114 to right and left traveling electric motors 113 is ensured in motor chamber 185. The air blown from cooling fan 60 is ejected outward from motor housing 120 through opening 120c.

In this way, cooling fans 111 and 60 disposed in motor chamber 185 of transaxle casing 112 directly blows air to respective electric motors 114 and 113 so as to effectively cool electric motors 114 and 113 by the air in comparison with cooling fans 111 and 60 of transaxle 46 that blow air to transaxle casing 47 so as to cool electric motors 4 and 45 in motor chamber 65 through walls of transaxle casing 47 and the fluid in transaxle casing 47.

Any lawn mower serving as an electric zero-turn working vehicle according to embodiment 3 may be provided with drive wheels 3 serving as right and left front wheels, and may be provided with a front-wheel driving transaxle supporting drive wheels 3. The transaxle has a single transaxle casing supporting right and left axles of respective drive wheels 3 and incorporating right and left traveling electric motors and a PTO electric motor. Each of rear-wheel driving transaxles 46 and 110 used for lawn mowers 1D and 1E can serve as the front-wheel driving transaxle. In this regard, lawn mower 1F serving as the alternative electric zero-turn working vehicle according to embodiment 1 is instructive.

Further, any lawn mower serving as an electric zero-turn working vehicle according to embodiment 3 may be provided with an alternative transaxle whose transaxle casing incorporating a PTO electric motor having a horizontal motor shaft, and may be provided with a propeller shaft interposed via universal joints between the motor shaft and an input shaft of a mower unit. Further, the alternative transaxle may be designed so that the position of the PTO electric motor in the fore-and-aft direction of the lawn mower can be changed only by reversing the transaxle casing, and the propeller shaft may be telescopic to correspond to the change of the position of the PTO electric motor. In this regard, lawn mower 1G serving as an alternative electric zero-turn working vehicle according to embodiment 1 is instructive. Further, if possible, the motor shaft may be tiltable as motor shaft 160 in lawn mower 1H.

Alternatively, if a PTO electric motor is rather light so that location of the PTO electric motor does not seriously influence an equilibrium between right and left traveling electric motors 4 (or 113), the PTO electric motor may be disposed outward from motor gap space 40, i.e., no part of the PTO electric motor may be disposed in motor gap space 40.

Figure 19:
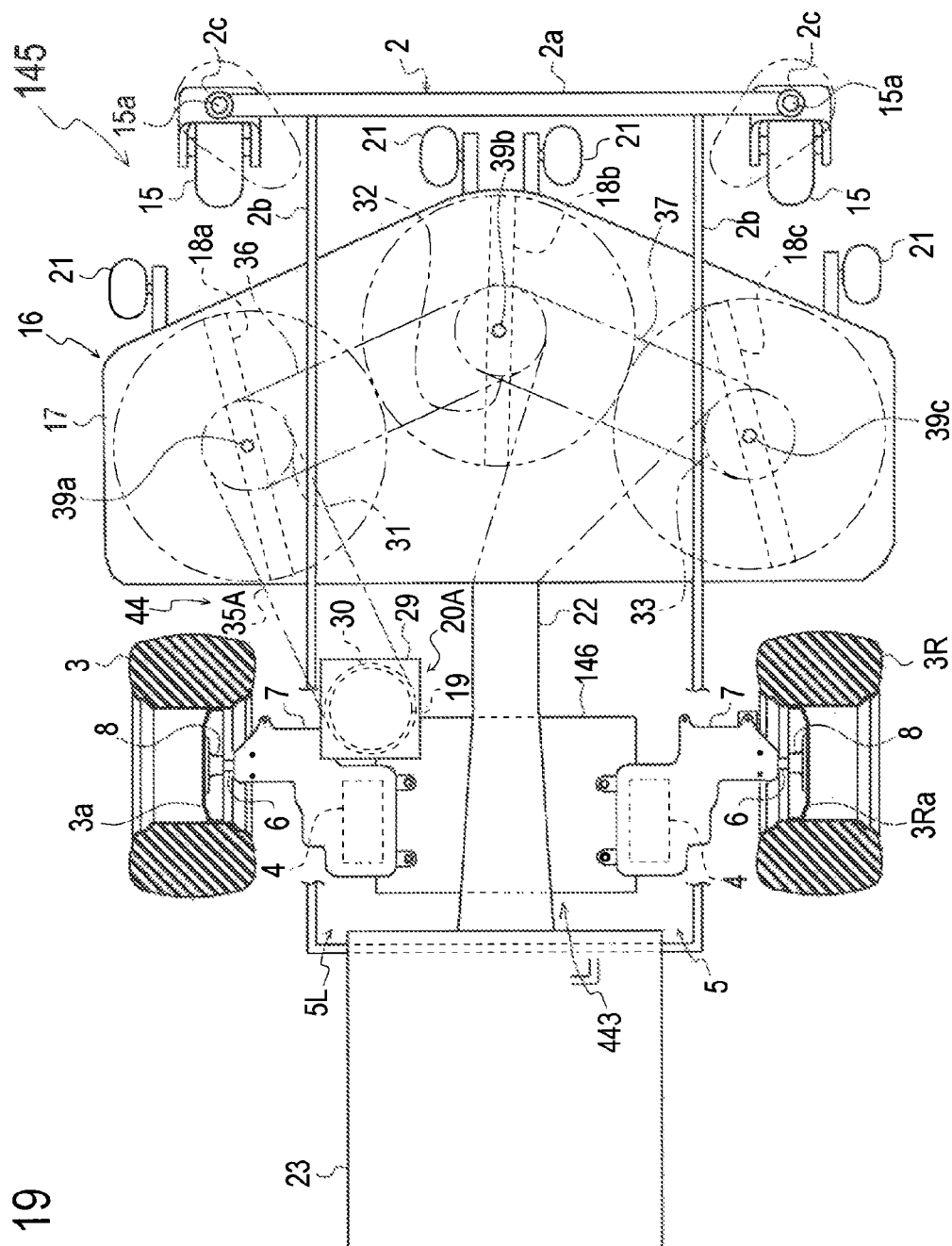
FIG. 19 is a plan view partly in section of a lawn mower 145 serving as an electric zero-turn working vehicle according to an embodiment wherein a PTO electric motor is disposed outward from a motor gap space between right and left traveling electric motors.
Figure 20:
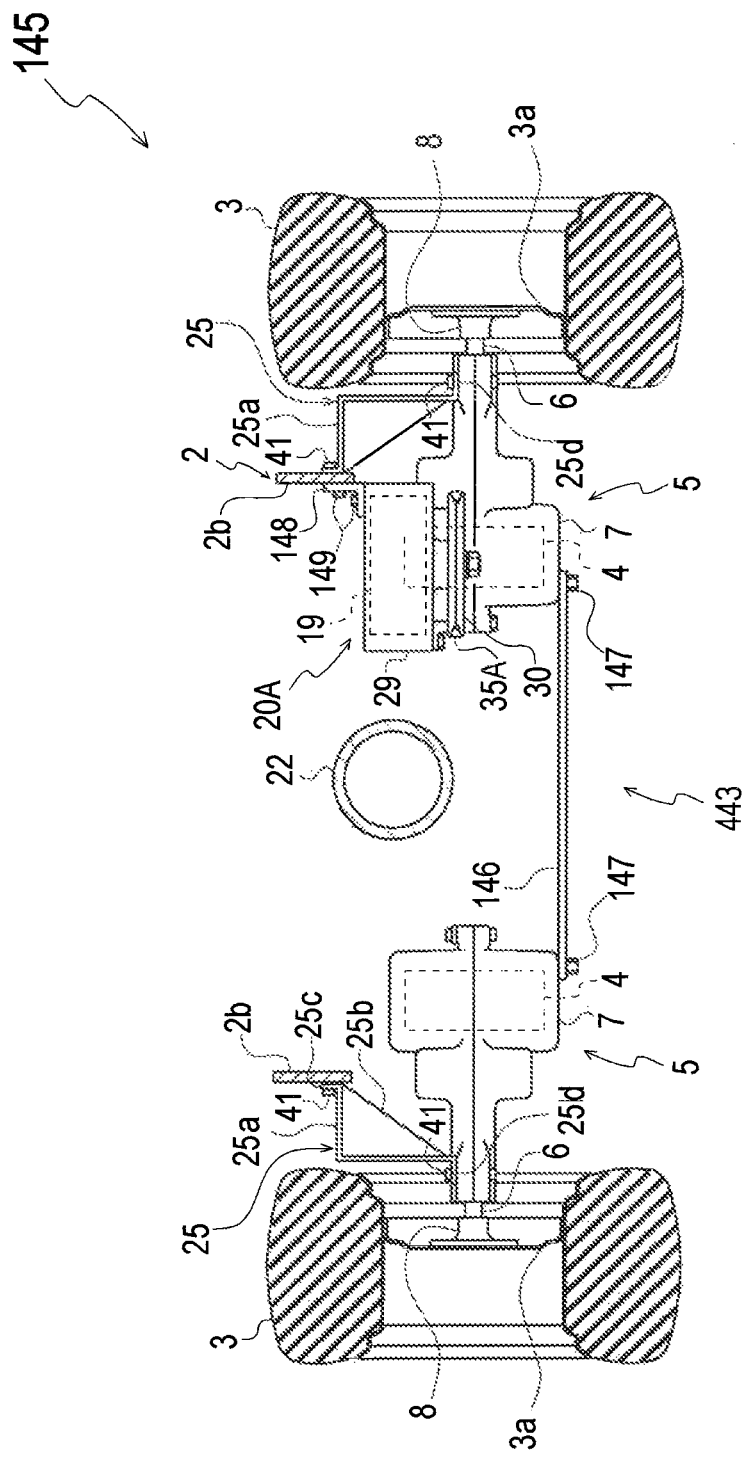
FIG. 20 is a sectional front view of lawn mower 145, including a front view of a rear-wheel driving assembly 443.

For example, referring to FIGS. 19 and 20, a lawn mower 145 is provided with a rear-wheel driving assembly 443 including right and left rear drive wheels 3, right and left transaxles 5, and a connection member 146 connecting transaxle casings 7 of right and left transaxles 5 to each other. Lawn mower 145 is provided with a PTO drive unit 20A including PTO motor casing 29 and PTO electric motor 19 disposed PTO motor casing 29. However, PTO drive unit 20A is not assembled in rear-wheel driving assembly 443, or is not attached to connection member 146 even if it is assembled in rear-wheel driving assembly 443. Right and left transaxle casings 7 are disposed below right and left side plates 2b of vehicle body frame 2 and are attached to right and left side plates 2b via respective right and left sub frames 25, similar to right and left transaxle casings 7 in lawn mower 1 as shown in FIGS. 1 to 3. However, PTO drive unit 20A including PTO electric motor 19 is disposed adjacent to one of right and left transaxle casings 7 (in this embodiment, left transaxle casing 7) and adjacent to corresponding side plate 2b (in this embodiment, left side plate 2b), and outward (in this embodiment, forward) from motor gap space 40 between right and left traveling electric motors 4. In this embodiment, PTO drive unit 20A adjoins left transaxle casing 7 and left side plate 2b, and on this assumption, PTO drive unit 20A will be described hereinafter.

As shown in FIG. 20, a bracket 148 is fastened at a horizontal bottom portion thereof to an upper surface of PTO motor casing 29, and at a vertical side surface thereof to an inside surface of left side plate 2b, via respective bolts 149, thereby fastening PTO drive unit 20A to left side plate 2b. Further, PTO motor casing 29 is fixed at a rear surface thereof to a front surface of left transaxle casing 7. Therefore, left transaxle 5 is strongly supported by left side plate 2b of vehicle body frame 2 via left sub frame 25 and PTO drive unit 20A.

In lawn mower 145, a belt 35A is interposed between pulley 30 on a motor shaft of PTO electric motor 19 and pulley 31 on blade drive shaft 39a so as to define power transmission passage 44 extended from PTO electric motor 19 to mower unit 16. As shown in FIG. 19, blade drive shaft 39a serving as an input shaft of mower unit 16 is disposed leftward from a lateral center of mower unit 16. Therefore, due to the arrangement of PTO drive unit 20A adjoining to left transaxle 5 and the left portion of vehicle body frame 2 and forward from motor gap space 40, belt 35A is short in comparison with belt 35 of lawn mower 1 interposed between pulley 30 on motor shaft 34 and pulley 31 on blade drive shaft 39a while PTO electric motor 19 having motor shaft 34 is disposed in motor gap space 40 at the equilateral position between right and left transaxles 5. Therefore, power transmission passage 44 defined by belt 35A is shortened so as to further reduce power loss.

In connection with the above-mentioned arrangement of PTO drive unit 20A, an alternative connection member 146 is interposed between right and left transaxle casings 7. PTO drive unit 20A is not mounted on connection member 146, and right and left end portions of connection member 146 are fixed to lateral proximal end portions of bottom surfaces of respective transaxle casings 7, as shown in FIG. 20, thereby expanding a free space above connection member 146. Whereby grass duct 22 can be extended through the space between right and left transaxle casings 7 including motor gap space 40.

Any of foregoing lawn mowers may be modified to have a PTO electric motor that is disposed outward from motor gap space 40 and is disposed adjacent to one of right and left transaxles, one of right and left drive wheels, or one of right and left traveling electric motors.

Further, for example, referring to FIG. 21, a lawn mower 157 has PTO electric motor 158 disposed outward from motor gap space 40. Lawn mower 157 has bracket 172 pivotally supporting PTO drive unit 161 including PTO electric motor 158, similar to lawn mower 1H shown in FIGS. 17 and 18. However, in lawn mower 157, bracket 172 is provided on a front end portion of vehicle body frame 2 forward from mower unit 166. In this regard, a cross member 178 is spanned between right and left side plates 2b along the front end of vehicle body frame 2 and right and left stays 174 and 174 of bracket 172 are extended downward from cross member 178 so as to pivotally support PTO drive unit 161.

In lawn mower 157, motor shaft 160 projects rearward from PTO motor casing 159 of PTO drive unit 161, mower unit 166 has an alternative input shaft 165A projecting forward from input gear box 164, and propeller shaft 163 is interposed between motor shaft 160 and input shaft 165A via front and rear universal joints 163a and 163b. Motor shaft 160 and input shaft 165A have a small distance therebetween in the fore-and-aft of lawn mower 157 and have different heights, however, the tilt angle of motor shaft 160 can be adjusted to reduce angles of universal joints 163a and 163b in compensation for the small fore-and-aft distance between motor shaft 160 and input shaft 165A causing increasing of angles of universal joints 163a and 163b.

Incidentally, in lawn mower 157, right and left transaxles 5 supporting right and left drive wheels 3 serving as rear wheels of lawn mower 157 are illustrated as being supported by rear portions of right and left side plates 2b of vehicle body frame 2 via right and left sub frames 25, however, any arrangement of right and left traveling electric motors and right and left drive wheels serving as rear wheels may be adapted to lawn mower 157.

As previously noted, description will now be given of rotors 72A, 72B, 72C, 72D and 72E each of which is adapted as an alternative rotor of traveling electric motor 4 having horizontal motor shaft 49 and disposed in wet motor chamber 65 of transaxle casing 47 of lawn mower 1D.

Before description of rotors 72A, 72B, 72C, 72D and 72E, rotor 72 as a conventional rotor will be described with reference to FIGS. 22(a) and 22(b), thereby clarifying the reason for providing alternative rotors 72A, 72B, 72C, 72D and 72E. As mentioned above, radiation holes 150 are formed in the vertical end surface of cup-shaped part 72a of rotor 72 so as to radiate heat from armature windings 71 surrounded by cup-shaped part 72a. Radiation holes 150 are extended radially with respect to a center hole 179 through which motor shaft 49 is passed, and are aligned at regular intervals in all directions around center hole 179.

Each radiation hole 150 has inner surfaces 150a, 150b, 150c and 150d extended perpendicular to the vertical end surface of cup-shaped part 72a of rotor 72 and parallel to the axis of motor shaft 49 passed through center hole 179, as shown in FIG. 22(b). In the axial view of rotor 72, as shown in FIG. 22(a), each radiation hole 150 is trapezoidal. Inner surfaces 150a and 150b correspond to unparallel sides of the trapezoidal shape of radiation hole 150. When a radial line 154 of each radiation hole 150 is assumed to extend radially with respect to center hole 179, inner surfaces 150a and 150b in the axial view of rotor 72 are slanted relative to radial line 154 of each radiation hole 150. In the axial view of rotor 72, inner surfaces 150c and 150d correspond to chordal lines of a circular shape of the vertical end surface of cup-shaped part 72a and correspond to parallel sides of the trapezoidal shape of radiation hole 150, and inner surface 150c is farther from center hole 179 than inner surface 150d, and is longer than inner surface 150d. Further, each radiation hole 150 has a rather large length along radial line 154 between inner surfaces 150c and 150d. Therefore, an area of each radiation hole 150 in the axial view of rotor 72 is increased due to its trapezoidal shape defined by inner surfaces 150a, 150b, 150c and 150d, and due to the rather large length of radiation hole 150 along radial line 154, thereby increasing heat radiated from radiation holes 150, i.e., thereby enhancing the efficiency of radiating heat.

However, as mentioned above, during rotation of rotor 72, each radiation hole 150, when submerged in the fluid sump in motor chamber 65, carries fluid of the fluid sump so as to cause agitation resistance of the fluid sump. In this regard, especially, inner surfaces 150a and 150b are directed to push fluid of the fluid sump during rotation of rotor 72. Therefore, reduction of an area of each of inner surfaces 150a and 150b is recommended for reducing the volume of fluid pushed by inner surface 150a or 150b. However, as mentioned above, the length of radiation hole 150 along radial line 154 is rather large, and inner surfaces 150a and 150b are slanted relative to radial line 154 so as to define the trapezoidal shape of radiation hole 150 in the axial view of rotor 72, so that the area of each of inner surfaces 150a and 150b is rather large to increase the volume of fluid pushed by inner surface 150a or 150b.

Alternative rotors 72A, 72B, 72C, 72D and 72E provided for reducing the radiation resistance of fluid sump caused by radiation holes will be described on the assumption that each of rotors 72A, 72B, 72C, 72D and 72E is shaped to have cup-shaped part 72a similar to rotor 72 except for radiation holes, and has the same size as rotor 72. Referring to FIGS.

23(*a*) and 23(*b*), rotor 72A has radiation holes 151 that are arranged around center hole 179 similar to radiation holes 150 of rotor 72. In this regard, rotor 72A has as many radiation holes 151 as radiation holes 150 of rotor 72.

Figure 23A:
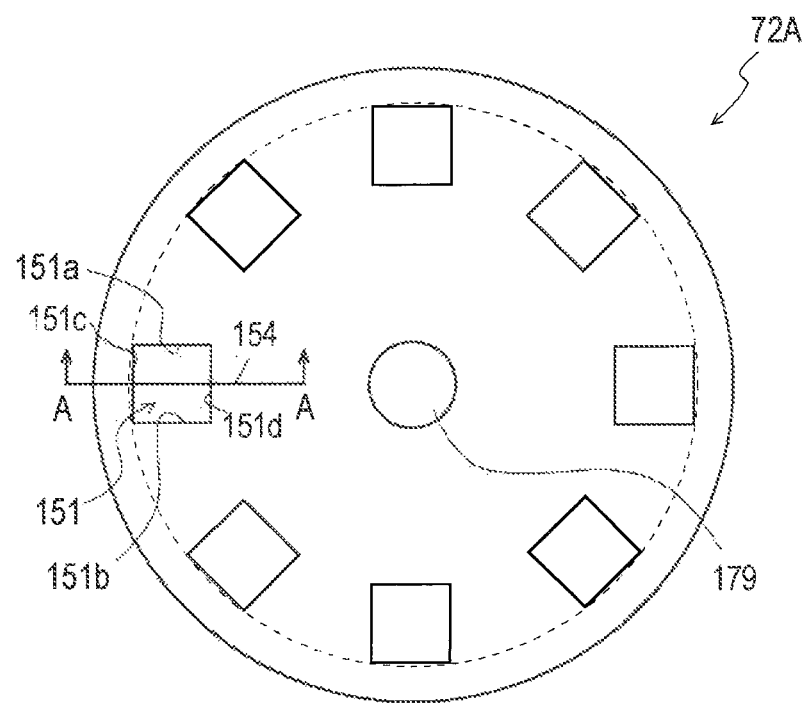
FIG. 23($a$) is a side view of a recommended rotor 72A.
Figure 23B:
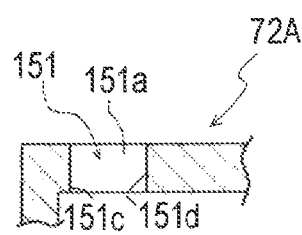

Each radiation hole 151 has inner surfaces 151*a*, 151*b*, 151*c* and 151*d* extended perpendicular to the vertical end surface of cup-shaped part 72*a* of rotor 72A and parallel to the axis of motor shaft 49 passed through center hole 179, as shown in FIG. 23(*b*). In the axial view of rotor 72, as shown in FIG. 23(*a*), each radiation hole 151 is square. Inner surfaces 151*c* and 151*d* appear as chordal lines with respect to the circular shape of the vertical end surface of cup-shaped part 72*a* of rotor 72A so as to correspond to inner surfaces 150*c* and 150*d*. However, a length of radiation hole 151 along radial line 154 between inner surfaces 151*c* and 151*d* is smaller than the length of radiation hole 150 along radial line 154 between inner surfaces 150*c* and 150*d*, and inner surface 150*c* is as long as inner surface 150*d* in the axial view of rotor 72A. As a result, each of inner surfaces 151*a* and 151*b* becomes parallel to radial line 154 so as to have a length along radial line 154 defined as the length of radiation hole 151 along radial line 154 between inner surfaces 151*c* and 151*d*, which is smaller than the length of radiation hole 150 along radial line 154 between inner surfaces 150*c* and 150*d*, thereby reducing an area of each of inner surfaces 151*a* and 151*b* directed to push the fluid, and thereby reducing agitation resistance of fluid against rotation of rotor 72A.

Figure 24A:
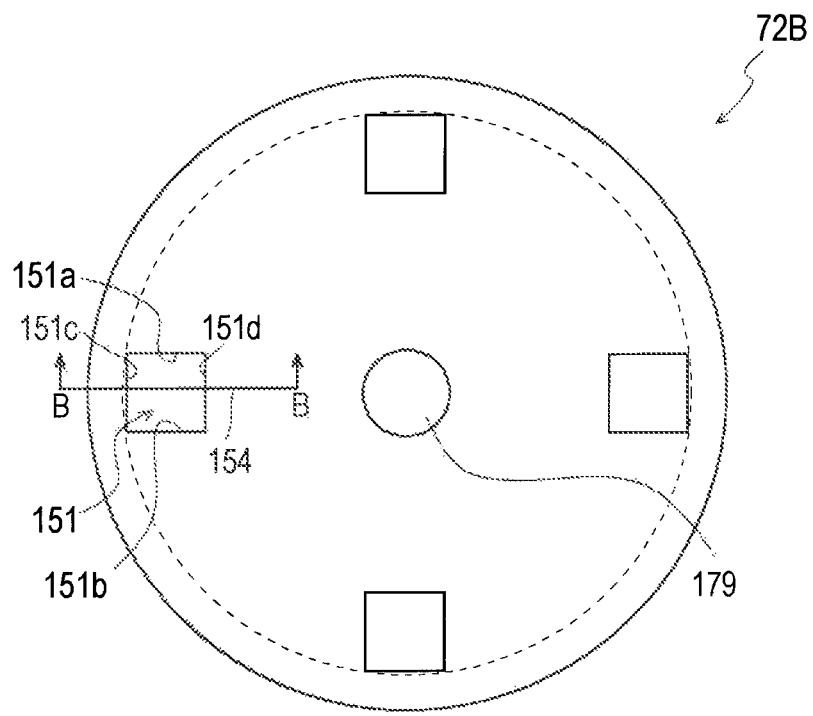
FIG. 24($a$) is a side view of a recommended rotor 72B.
Figure 24B:
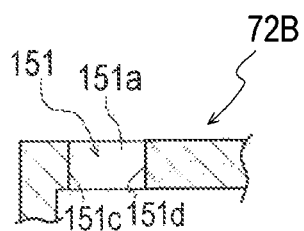

Referring to FIGS. 24(*a*) and 24(*b*), rotor 72B has radiation holes 151 each of which is the same as radiation hole 151 of rotor 72A, however, the number of radiation holes 151 of rotor 72B is less than the number of radiation holes of rotor 72A, thereby reducing the total volume of fluid pushed by inner surfaces 151*a* or 151*b* of radiation holes 151, and thereby reducing agitation resistance of the fluid sump against rotation of rotor 72B.

Figure 25A:
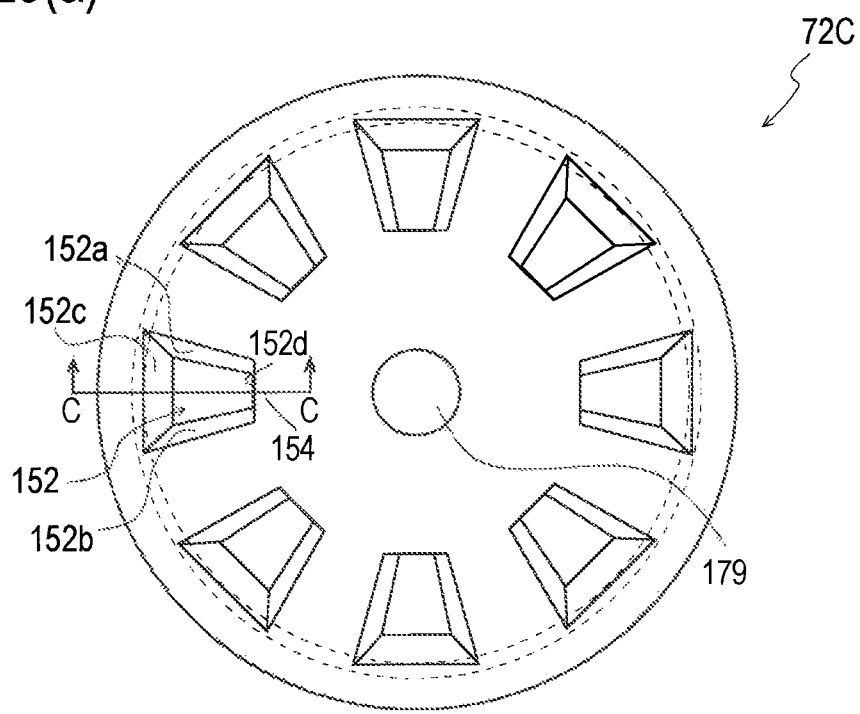
FIG. 25($a$) is a side view of a recommended rotor 72C.
Figure 25B:
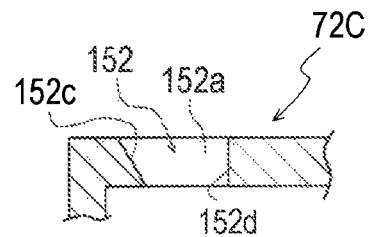

Referring to FIGS. 25(*a*) and 25(*b*), rotor 72C has radiation holes 152 that are arranged around center hole 179 similar to radiation holes 150 of rotor 72. In this regard, rotor 72C has as many radiation holes 152 as radiation holes 150 of rotor 72. Further, the trapezoidal shape of each radiation hole 152 in the axial view of rotor 72C, as shown in FIG. 25(*a*), is similar to the trapezoidal shape of each radiation hole 150 in the axial view of rotor 72 as shown in FIG. 22(*a*). Each radiation hole 152 has inner surfaces 152*a*, 152*b*, 152*c* and 152*d* defining the trapezoidal shape of radiation hole 152 so as to correspond to inner surfaces 150*a*, 150*b*, 150*c* and 150*d* of radiation hole 150, respectively.

Inner surface 152*d* is extended perpendicular to the vertical end surface of cup-shaped part 72*a* of rotor 72C and parallel to the axis of motor shaft 49 passed through center hole 179, similar to corresponding inner surface 150*d*, however, inner surfaces 152*a*, 152*b* and 152*c* are sloped slantwise relative to the axis of motor shaft 49 so as to taper radiation hole 152, thereby smoothening discharge of fluid from each radiation hole 152 along three sloped inner surfaces 152*a*, 152*b* and 152*c*, and thereby reducing agitation resistance of the fluid sump.

Figure 26A:
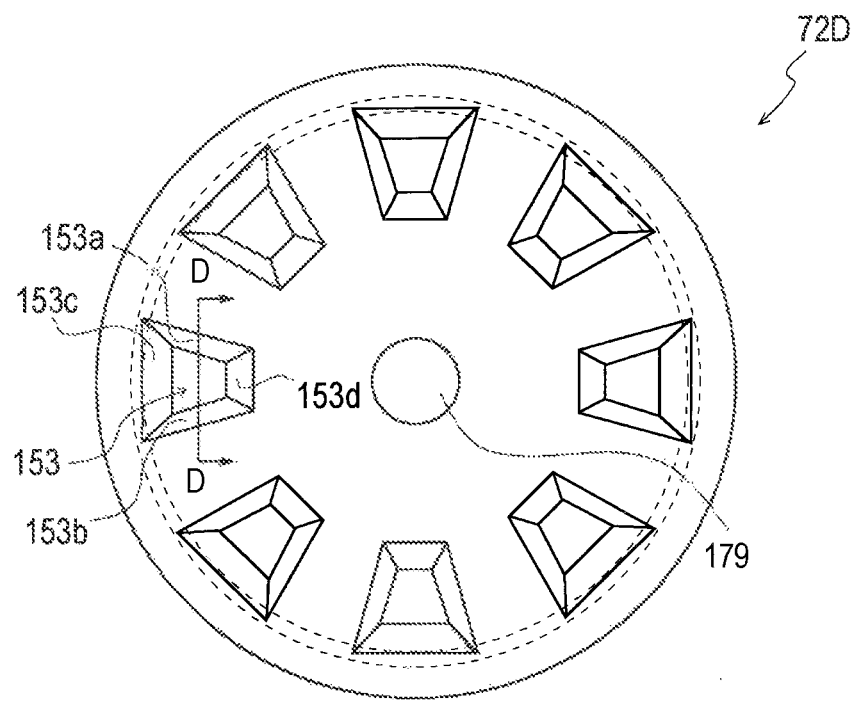
FIG. 26($a$) is a side view of a recommended rotor 72D.
Figure 26B:
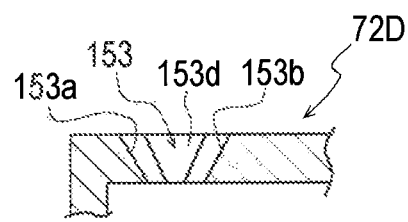

Referring to FIGS. 26(*a*) and 26(*b*), rotor 72D has radiation holes 153 that are arranged around center hole 179, similar to radiation holes 152 of rotor 72C. Each radiation hole 153 has inner surfaces 153*a*, 153*b*, 153*c* and 153*d* defining the trapezoidal shape of radiation hole 153 so as to correspond to inner surfaces 152*a*, 152*b*, 152*c* and 152*d* of trapezoidal radiation hole 152, respectively. All inner surfaces 153*a*, 153*b* 153*c* and 153*d* are sloped slantwise relative to the axis of motor shaft 49 so as to taper radiation hole 153, thereby further smoothening discharge of fluid from the inner space of each radiation hole 153 along all four sloped inner surfaces 153*a*, 153*b*, 153*c* and 153*d*, and thereby reducing agitation resistance of the fluid sump.

Figure 27A:
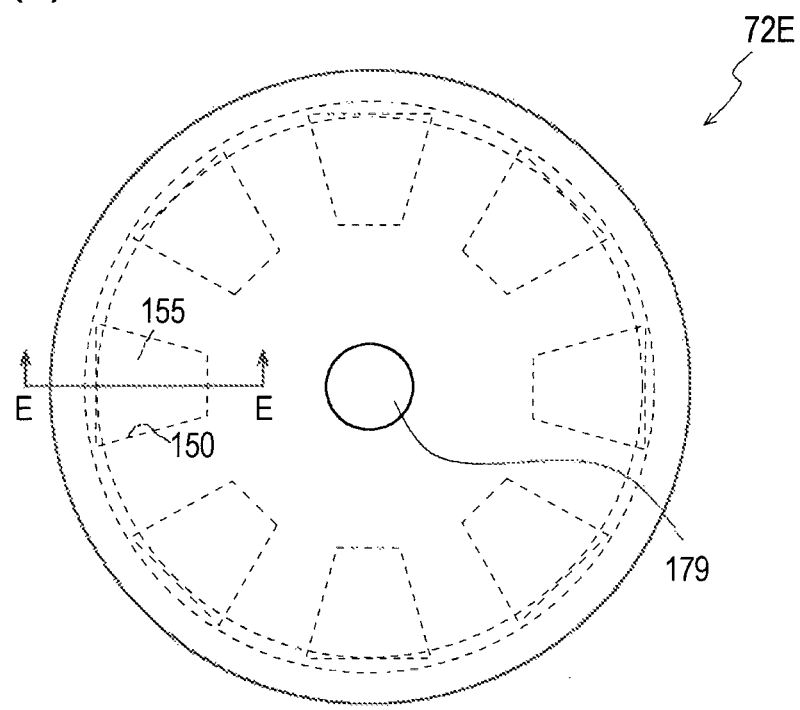
FIG. 27($a$) is a side view of a recommended rotor 72E.
Figure 27B:
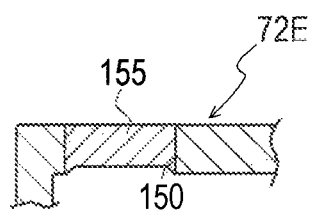

Further, referring to FIGS. 27(*a*) and 27(*b*), rotor 72E has no radiation hole formed in the vertical end surface of cup-shaped part 72*a* thereof as shown in FIG. 27(*a*), or has radiation holes 150 closed by plugs 155 fitted into respective holes 150 as shown in FIG. 27(*b*) (and as drawn in dotted lines in FIG. 27(*a*)), so as to farther reduce agitation resistance of the fluid sump. Rotor 72E is appropriate if the opening of cup-shaped part 72*a* of rotor 72E opposite to the vertical end surface has an area that is large sufficiently to cool the interior members surrounded by cup-shaped part 72*a*.

It is further understood by those skilled in the art that the foregoing description is a preferred embodiment of the disclosed apparatus and that various changes and modifications may be made in the invention without departing from the scope thereof defined by the following claims.

What is claimed is:

1. An electric zero turn working vehicle comprising:
   a vehicle body frame;
   right and left drive wheels;
   a working implement; and
   a wheel-driving assembly supported by the vehicle body frame,
   wherein the wheel-driving assembly includes right and left first electric motors for driving the respective right and left drive wheels, a second electric motor for driving the working implement, and a transaxle, including at least one of the right and left first electric motors,
   wherein the right and left first electric motors have a space therebetween,
   wherein the transaxle is supported by the vehicle body frame and is disposed below the vehicle body frame,
   wherein the wheel-driving assembly includes a means overlapping the space in a plan view, and
   wherein the second electric motor is supported by the means overlapping the space so that at least a part of the second electric motor is disposed in the space between the right and left first electric motors.

2. The electric zero-turn working vehicle according to claim 1, wherein the transaxle includes one of the right and left first electric motors, and
   wherein the wheel-driving assembly includes another transaxle including the other of the right and left first electric motors, so that the transaxle including the right first electric motor is defined as a right transaxle, the transaxle including the left first electric motor is defined as a left transaxle, and a space is provided between the right and left transaxles so as to define the space between the right and left first electric motors, and
   wherein the means overlapping the space is interposed between the right and left transaxles so as to connect the right and left transaxles to each, other.

3. The electric zero-turn working vehicle according to claim 2,
   wherein the wheel-driving assembly includes a horizontal plate-shaped connection member serving as the means overlapping the space, so that the space is disposed above or below a horizontal surface of the connection member, and
   wherein the wheel-driving assembly includes a drive unit including the second electric motor, the drive unit being provided on the connection member.

4. The electric zero-turn working vehicle according to claim 2,
 wherein the wheel-driving assembly includes a motor casing incorporating the second electric motor so that the motor casing serves as the means overlapping the space.

5. The electric zero-turn working vehicle according to claim 4, wherein the motor casing connects the right and left transaxles to the vehicle body frame.

6. The electric zero-turn working vehicle according to claim 4, further comprising:
 a battery for supplying electric power to the right and left first electric motors and the second electric motor, wherein the battery is mounted on the motor casing.

7. The electric zero-turn working vehicle according to claim 1, wherein the transaxle includes a transaxle casing incorporating the right and left first electric motors and the second electric motor so that the space between the right and left first electric motors is provided in a part of the transaxle casing incorporating the second electric motor, whereby the part of the transaxle casing serves as the means overlapping the space, and whereby the transaxle serves as the wheel-driving assembly by itself.

8. The electric zero-turn working vehicle according to claim 7, wherein the transaxle casing has a hole, and wherein wires for controlling the right and left first electric motors and the second electric motor are bundled and passed through the hole.

9. The electric zero-turn working vehicle according to claim 7, wherein the second electric motor has a motor shaft, and wherein an end of the motor shaft projects outward from the transaxle casing, the electric zero-turn working vehicle further comprising:
 a cooling fan fixed on the end of the motor shaft.

10. The electric zero-turn working vehicle according to claim 1, wherein the working implement is a mower unit disposed below the vehicle body frame, the electric zero-turn working vehicle further comprising:
 a grass box; and
 a grass duct interposed between the mower unit and the grass box so as to guide grass mowed by the mower unit to the grass box.

11. The electric zero-turn working vehicle according to claim 10, wherein the grass duct is extended through the space between the right and left first electric motors.

12. The electric zero-turn working vehicle according to claim 10, wherein the grass duct is extended above the space between the right and left first electric motors.

\* \* \* \* \*

UNITED STATES PATENT AND TRADEMARK OFFICE
CERTIFICATE OF CORRECTION

PATENT NO.      : 8,579,055 B2                              Page 1 of 1
APPLICATION NO. : 13/082624
DATED           : November 12, 2013
INVENTOR(S)     : Kengo Sasahara et al.

It is certified that error appears in the above-identified patent and that said Letters Patent is hereby corrected as shown below:

In the Claims

In column 30, line 32 (claim 1): "and a transaxle, including" should read --and a transaxle including--.

In column 30, line 57 (claim 2): "transaxles to each, other" should read --transaxles to each other--.

In column 30, line 62 (claim 3): "overlapping the space, so that" should read --overlapping the space so that--.

Signed and Sealed this
Twenty-sixth Day of August, 2014

Michelle K. Lee
*Deputy Director of the United States Patent and Trademark Office*